(12) United States Patent
Yang et al.

(10) Patent No.: US 12,087,047 B2
(45) Date of Patent: Sep. 10, 2024

(54) MACHINE LEARNING MODEL AND NEURAL NETWORK TO PREDICT DATA ANOMALIES AND CONTENT ENRICHMENT OF DIGITAL IMAGES FOR USE IN VIDEO GENERATION

(71) Applicant: Celebr8 Life, Inc., Bethlehem, PA (US)

(72) Inventors: Bo Yang, Macungie, PA (US); Steven C. Freed, Perkiomenville, PA (US)

(73) Assignee: Celebr8 Life, Bethlehem, PA (US)

( * ) Notice: Subject to any disclaimer, the term of this patent is extended or adjusted under 35 U.S.C. 154(b) by 351 days.

(21) Appl. No.: 17/829,445

(22) Filed: Jun. 1, 2022

(65) Prior Publication Data

US 2022/0415035 A1     Dec. 29, 2022

Related U.S. Application Data

(60) Provisional application No. 63/213,813, filed on Jun. 23, 2021.

(51) Int. Cl.
*G06V 10/82* (2022.01)
*G06V 10/422* (2022.01)
(Continued)

(52) U.S. Cl.
CPC ............ *G06V 10/82* (2022.01); *G06V 10/422* (2022.01); *G06V 10/7788* (2022.01); *G06V 20/41* (2022.01)

(58) Field of Classification Search
CPC .. G06V 10/82; G06V 10/422; G06V 10/7788; G06V 20/41; G06V 10/30; G06V 40/103; G06V 40/172; G06V 20/30
See application file for complete search history.

(56) References Cited

U.S. PATENT DOCUMENTS 6,396,963 B2   5/2002  Shaffer et al.
8,087,054 B2   12/2011 Zacks et al.
(Continued)

OTHER PUBLICATIONS

R. Goel and A. Jain, "The Implementation of Image Enhancement Techniques on Color n Gray Scale IMAGEs," 2018 Fifth International Conference on Parallel, Distributed and Grid Computing (PDGC), Solan, India, 2018, pp. 204-209. (Year: 2018).*

*Primary Examiner* — Brandon J Miller
(74) *Attorney, Agent, or Firm* — James R. McDaniel

(57) ABSTRACT

Systems, methods, and other embodiments for selecting, enriching and sequencing digital media content to produce a narrative-oriented, ordered sub-collection of media such as for movie creation. The method identifies, evaluates, assesses, stores, enriches, groups, and sequences content. The method identifies the content metadata. When metadata are missing or anomalous, the method attempts to populate or correct the metadata and store that new content in the database. The method evaluates content for focus quality and may exclude content based on rules. The method assesses the content storing the people and their emotional level, animals, objects, locations, landmarks and date/time in the database. The method can then enrich the remaining content by providing map, photo, video, text, and audio content. The method uses selecting criteria for grouping and sequencing content by date, time, person, etc. and compiling the sequenced groups into the final narrative ready for distribution, e.g., movie creation.

20 Claims, 12 Drawing Sheets

(51) Int. Cl.
   *G06V 10/778* (2022.01)
   *G06V 20/40* (2022.01)

(56) References Cited

U.S. PATENT DOCUMENTS

| | | |
|---|---|---|
| 8,923,551 B1 | 12/2014 | Grosz et al. |
| 8,934,717 B2 | 1/2015 | Newell et al. |
| 9,053,076 B2 | 6/2015 | Grosz et al. |
| 9,268,849 B2 | 2/2016 | Siedlecki et al. |
| 9,430,719 B2 | 8/2016 | Gokturk et al. |
| 9,485,365 B2 | 11/2016 | Chen et al. |
| 9,906,610 B1 * | 2/2018 | Foster .................... H04L 67/53 |
| 10,558,860 B2 | 2/2020 | Hibino et al. |
| 10,747,806 B2 | 8/2020 | Levin et al. |
| 2006/0274949 A1 * | 12/2006 | Gallagher ............ G06V 40/172 |
| | | 382/228 |
| 2007/0250532 A1 | 10/2007 | Beato et al. |
| 2017/0357877 A1 * | 12/2017 | Lin ........................ G06V 20/47 |
| 2022/0245792 A1 * | 8/2022 | Gao ...................... G06T 7/0008 |

* cited by examiner

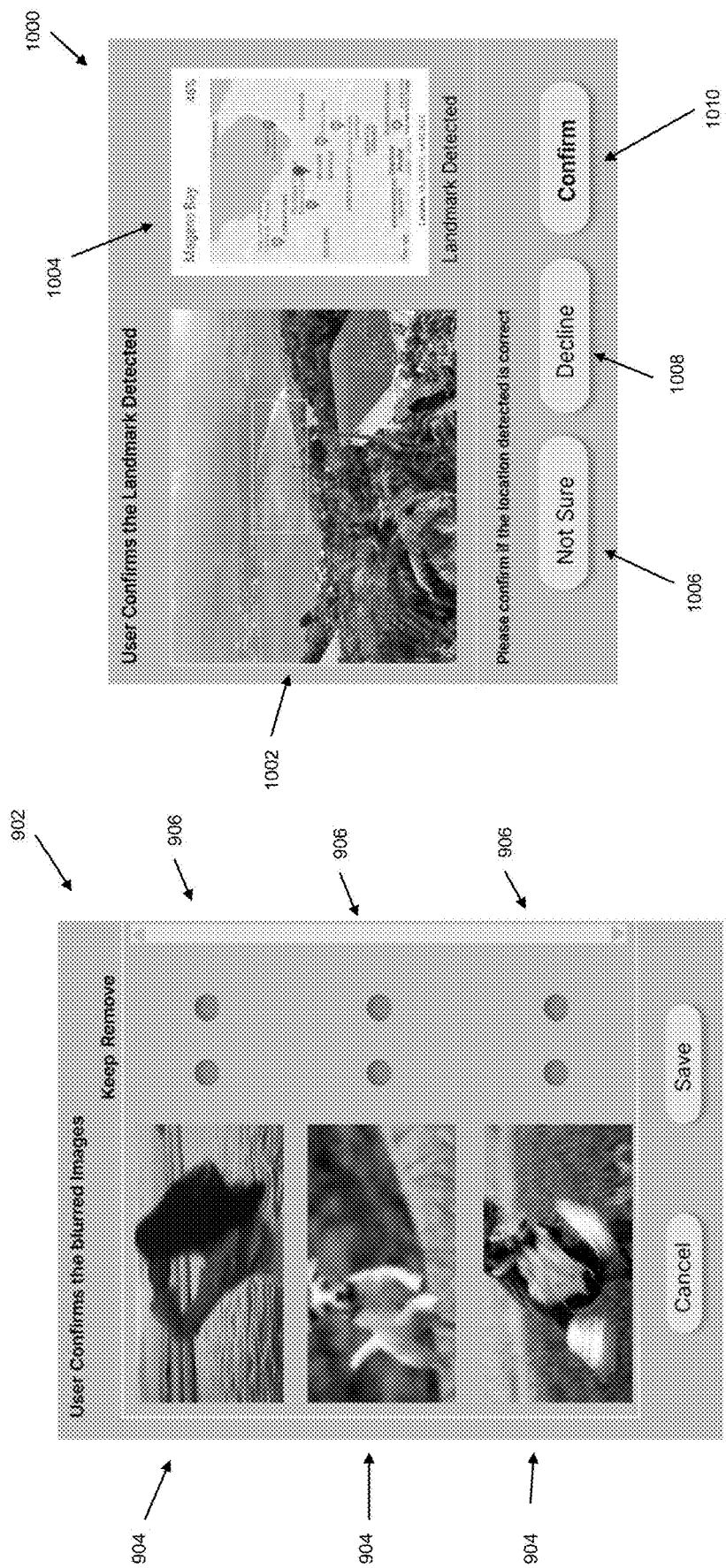

ental Patent Application 63/213,813, filed on Jun. 23, 2021,

MACHINE LEARNING MODEL AND NEURAL NETWORK TO PREDICT DATA ANOMALIES AND CONTENT ENRICHMENT OF DIGITAL IMAGES FOR USE IN VIDEO GENERATION

CROSS-REFERENCE TO RELATED APPLICATIONS

This application is a continuation-in-part of U.S. Provisional Patent Application 63/213,813, filed on Jun. 23, 2021, the disclosure of which is hereby incorporated by reference in its entirety to provide continuity of disclosure to the extent such a disclosure is not inconsistent with the disclosure herein.

FIELD OF THE INVENTION

The present invention is generally related to the analysis and presentation of digital media. More specifically, the functions of the present invention fall within the category of automating the thematic selection, grouping, and sequencing of digital photos and videos through the use a machine learning model and a neural network.

BACKGROUND OF THE INVENTION

The field of digital media continues to grow. One estimate puts the number of digital photos stored and shared online at over 2.5 trillion annually. Furthermore, the prevalence of short videos is a recent development in the consumption of digital media. Compilations of photos and videos shown as a slideshow increasingly dominate the way that events are recalled or presented. This media form often displays polished memories that are shared with participants and interested audiences. However, because of the novelty of the short video as a viable media format, services to aid in its creation lag the demand.

While a great deal of work has taken place to ease the means of aggregating photos and videos, there remains four primary problems for users wishing to create their own videos. Those problems are 1.) the extensive amount of time taken to create the video (often this alone leads to videos not being generated), 2.) the quality of the content (a variety of anomalies are frequent), 3.) the ability to effectively sequence the content when pooled into large content databases, and 4.) an efficient means of supplementing content for enrichment purposes. Without addressing these four problems, the value proposition of creating your own compilation video is limited.

It is known to provide systems and methods to aggregate photos and videos. For instance, U.S. Pat. No. 9,906,610 (Event-Based Media Sharing) aggregates and stores media from multiple sources relating to the same event in order to gather a media compilation representative of that event. However, this system fails both primarily, ensuring the quality of its final aggregation and supplementing to enrich the content, and secondarily, sophisticated sorting/grouping and complex video production.

It is also known to group media. For example, prior art includes the Method of Selecting Important Digital Images (U.S. Pat. No. 10,558,860) and the Proactive Creation of Image-Based Products (U.S. Pat. No. 10,747,806). Respectively, these separately address the issue of the hierarchy of importance of a set of digital images and determining a grouping of associated or similar images. However, the approaches used are different and, in some ways, opposi-tional to the methods of the present invention. In particular, U.S. Pat. No. 10,558,860 seeks to identify important photos by duplication, the more similar photos there are, the more likely people will like that type of image. For the purposes of this invention, multiple images of the same type are a negative and would overload the video with similar images. Also, U.S. Pat. No. 10,747,806 leverages user feedback to select a preferred option. Conversely, the present invention seeks to automate and reduce user selection. For the use case of this invention, the prior art fails in both cases.

Finally, it is known to assemble the selected media and create a compilation video, complete with transitions and a soundtrack. For example, Cloud Storage for Image Data, Image Product Designs, and Image Projects (U.S. Pat. No. 9,485,365) performs a similar function, but assembles a photobook intended to be printed. Conversely, the present invention is as much about the back-end components as it is about the photobook produced. Yet with recent trends to an increasingly digitized record of media, and digital media being more reliable and durable, it would be desired to tailor the functionality of the system and method to modern forms of media consumption.

Given the above prior art discussion, it would be desired if the system and method for aggregating photos and videos could address the previously mentioned problem areas: missing metadata; anomalies; content enrichment; and grouping/sequencing of content. In terms of missing data and anomalies, prior art did not attempt to address this. Also, it would be desired if the system and method for aggregating photos and videos could enrich the content. With regard to grouping and media significance, it would be desired if the system and method for aggregating photos and videos could leverage the assessments completed during the missing data and anomaly detection actions which would help to identify people, places, and objects within the content. In particular, that knowledge could then be used in combination with the content metadata and photo quality assessment (e.g., smile detection, etc.) to select and group content more effectively than the prior art.

Finally, it would be desired if the system and method for aggregating photos and videos could produce a consumable selection of media by offering users a completely digital experience. In this manner, by creating a compilation video rather than a printable collection of photos to document and memorialize an event, the final product may include media forms such as videos and graphics interchange formats (gifs), and the product offers durability and accessibility beyond any paper product.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

FIG. 9 illustrates one embodiment of a graphical user interface configured to allow the user to confirm blurred images.

FIG. 10 illustrates one embodiment of a graphical user interface configured to allow the user to confirm a landmark detected.

DETAILED DESCRIPTION OF THE PREFERRED EMBODIMENTS OF THE INVENTION

Figure 1A:
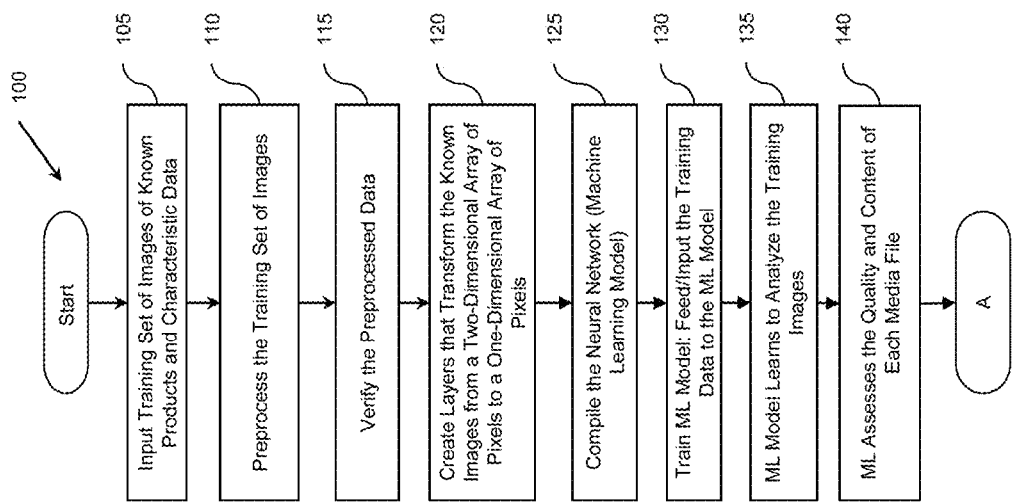
FIGS. 1A and 1B illustrate one embodiment of a method for training a machine learning model with known digital images.

Systems and methods are described herein that implement a machine learning (ML) model configured with a neural network to predict data anomalies and content enrichment of digital images for use in video generation. In one embodiment, the present technique trains a machine learning model (including a neural network) with a collection of visual media content sourced from multiple individuals or mobile devices/computers. The known images may include associated characteristics of each image (e.g., object orientation or image view, landmarks, people, clothing, etc.) and characteristics of its corresponding object shown in the image (e.g., hair color, clothing color, landmark shape, landmark color, clothing type, historical event data, etc.). The machine learning model filters the media based on quality and relevance, pertaining to, e.g., a single event, a gathering, or a shared memory. The machine learning model is used in one embodiment since the machine learning model can learn from its own performance, user feedback, and/or acceptance of machine learning predictions in order to modify its own predictions. Then, the final collection of ordered media is distributed back to the users. This process can thus create a narrative-oriented album, video, etc. of a memory shared among its participants.

In one embodiment, the machine learning model is configured to detect gaps or anomalies in the media and address those issues found, supplement, group, and sequence digital media. A video of the content is then produced. Furthermore, the machine learning model is configured to analyze the metadata associated with the media to find patterns in the media. In particular, the machine learning model is configured to eliminate poor-quality content in the media; identify duplicate content in the media; distinguish a sequence for the content that avoids disruptions or jumps in location, time, or other content factors in the media; and enrich content of the media based on data analyzed in the media.

For example, if the geographic location of a photo is not within a certain proximity of the rest of the collection, in one embodiment, the machine learning model is configured to recognize that this photo was probably unintentionally included. Thus, what is gathered is rich data (data that is descriptive and reliable). In this context, rich data would be the necessary information to describe the content of the media and the subjects of the visual media as a human viewer would understand it. In another embodiment, at the finish of most functions, a user is queried through a graphical user interface (GUI) to confirm the analyses and decisions suggested by the machine learning model.

The machine learning model additionally is configured to take on the task of identifying scenes within the media set. In one embodiment, the machine learning model is configured to perform this function by sorting the media if, for instance, the scenes captured take place in disparate intervals yet feature the same subjects. While analyzing the metadata and identifying common people, objects, landmarks, etc., the machine learning model is configured to create a database. This embodiment can then use concepts of graph theory, such as global clustering or other types of clustering, and the database that the machine learning model has created to recognize themes in the media based on location, time, people, objects, and activities associated with the media. Again, the GUI can be configured to interact with the ML model to query the user and obtain the user's input for the final organization of the media.

The ability of the machine learning model to handle a large number of media through a systematic organization design eliminates the need for manual selection. As discussed above, manual selection and organization are currently standard, in practice. However, given larger sets of files to sort, the task becomes proportionally more involved. Take, for example, an event involving hundreds of participants. Typical memorabilia would include a photo album, digital or not, of collected media. Should each participant submit hundreds of files, manually sorting for the relevant, high-quality media files would be grueling, if not insurmountable. The machine learning model, however, removes that onus entirely.

The metadata handling by the machine learning model further extends the capabilities of the human intent to filter and organize media files. While metadata are accessible, they are not always immediately available. Moreover, the analysis of elements of metadata would include several considerations. Time, location, and device used at the media foe's creation are only a few details included within. Additionally, there is a motivation to modify incorrect or inaccurate metadata, or even supplement missing metadata. For instance, it is known that some digital cameras reset its' date and time information every time the battery is replaced. Perhaps, every photo it takes is marked as ten years older than it is, and it offers no location services. However, a person could tell that the timestamp is wrong and recognize the location. In a larger file of photos, those photos could then be difficult to find, if they are organized by date. The machine learning model is configured to detect those anomalous or missing metadata details in the media. In one embodiment, by analyzing the content and details of the photos, videos, etc., the machine learning model could discover those same findings. Then, those suggestions would be presented to the user through the GUI, wherein the GUI is configured to interact with the ML model to allow the user to confirm the supplanting or insertion of those inaccurate or missing details.

Whereas editing the metadata by hand is possible, and unchallenging, editing the metadata of large numbers of files manually would be extremely taxing. The work required to decipher the correct data for photos and videos captured over several days and multiple locations, compounded by a sizeable file collection, would be a very cumbersome task to perform by a human. Thus, the embodiment of metadata handling would simplify the human involvement to confirming or denying those changes mainly through the use of the GUI.

Yet, while the concept of the machine learning model lies in recreating or mimicking memory, the machine learning model is configured for further applications. Immediately, the machine learning model generalizes to create accounts of public as well as private events. Any number of users may submit content, thereby simplifying the documentation of large gatherings. This includes multi-day, planned conferences or weddings, for which, in one embodiment, the machine learning model could be configured to create 360-degree views of all events. Key figures can be recognized, such as speakers or wedding party members. The machine learning model also is configured to identify multi-location traveling because the machine learning model can group significant locations and times of the media. In another embodiment, the machine learning model could be configured to document small community events or corporate gatherings.

Before the final compilation, in one embodiment, the machine learning model is configured to process the media files and interact with the user through the GUI for optional content enrichment. The content enrichment would potentially provide a background on the setting or place type associated with the media. The machine learning model could also be configured to potentially supply the address and additional photos of the setting associated with the media. Location may be an integral part of a collection of photos. It may be a key theme or central to the collective memory of the participants involved. This function would enhance the value of a collection if the setting is of interest.

Furthermore, in one embodiment, the machine learning model can be configured to organize the remaining media files in a narrative order for presentation or distribution purposes.

In one embodiment, the ML model may generate an electronic message with the movie (or gif) and transmit the electronic message via a network communication to a remote computer.

Training of the Machine Learning Model

Figure 1B:
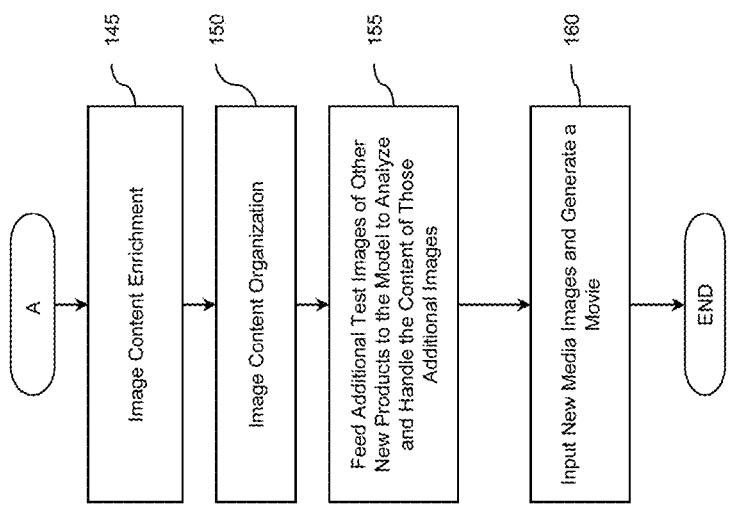

With reference to FIGS. 1A and 1B, one embodiment of a method 100 for training a machine learning model with known digital images is illustrated. The method 100 is performed by at least a processor of a computer system that accesses and interacts with memories and/or data storage devices. For example, the processor at least accesses and reads/writes data to the memory and processes network communications to perform the actions of FIG. 1.

To train a neural network model such as a machine learning model to classify digital images of objects/people, attention is directed to FIG. 1. In one embodiment, the neural network is trained to identify images of objects/people based upon the collection of sets of media. The machine learning model is further trained and configured to analyze the quality, fit, and metadata of each of the sets of media for inaccuracy and unavailability. Media that fall short of the determined quality guidelines are eliminated from the final collection. The final collection will be determined and processed by the machine learning model to enrich the content of the final collection. Finally, the final collection is organized and presented as a movie or gif.

As shown in FIG. 1A, at block 105, the method 100 is initiated when a plurality of sets of digital images are input to a machine learning model. The known images may include associated characteristics of each image (e.g., object orientation or image view, landmarks, people, clothing, etc.) and characteristics of its corresponding object shown in the image (e.g., hair color, clothing color, landmark shape, landmark color, clothing type, historical event data, etc.) The digital images may be retrieved from a database or a memory from a computer system. Typically, tens, hundreds, or even thousands of digital images may be inputted into the machine learning model as a training set of data. In one embodiment, the digital images may be stored as image pixel data in the database, but the system is not limited to such format. Other image formats may be used.

As will be discussed in greater detail later, the digital images are used to train the neural network of the machine learning model. Then the machine learning model may be tested with a test set of new digital images to evaluate how accurately the neural network learned to classify the known images and how accurately the neural network identified objects/people that appear in the new digital images.

In one embodiment, each of the digital images of objects/people may show an object (or objects) and/or a person (or persons). The objects may be landmarks, clothing, other objects typically found in digital media such as photographs and/or videos. Also, the person (or persons) may also be a person (or persons) typically found in digital media such as photographs and/or videos.

In one embodiment, the ML model includes one or more digital image analysis algorithms configured to extract information from the digital images. The digital images may be processing by pixel analysis. Object-based image analysis may also be applied that groups pixels from a digital image into homogeneous objects that can be used to classify objects. Object statistics associated with image objects may be determined, for example, size, geometry, texture, and context of image objects. The object statistics may also be used to classify the corresponding image object. Thus, in one embodiment, the machine learning model may be configured to analyze the digital pixel data of the digital images and include object-based image analysis to group pixels to identify the object/people in the digital image.

At block 110, the training set of digital images (including the image pixel data, image orientation data, and the data associated with the image such as metadata) are preprocessed before training the neural network to verify that the data is in a specified format for the machine learning model.

At block 115, the preprocessed images are verified to ensure that the data is in the correct format.

At block 120, in one embodiment, the neural network (machine learning model) is initially constructed by creating layers that transform the known digital images from a two-dimensional array of pixels to a one-dimensional array of pixels. In this manner, the two-dimensional array of pixels is "unstacked", and the pixels are then "lined up". This step simply reformats the data. After the pixels are flattened (lined up), the neural network includes a sequence of two layers of "lined up" pixels. These pixel layers are fully connected neural network layers.

At block 125, the neural network (machine learning (ML) model) is compiled. This may include specifying an optimizer to fit the model and a loss function that is used in optimization. Compiling a neural network is beyond the scope of this disclosure and is not described in detail.

At block 130, training of the neural network is initiated by feeding the training data (data from the known digital images) to the ML model. In one embodiment, the neural network may be trained using the known digital images. In another embodiment, a neural network may be used and trained by machine learning on a random set of digital images.

At block 135, the ML model learns to analyze the training images. In one embodiment, the ML model is trained to analyze the quality, fit, and metadata of each of the sets of media (i.e., known digital images) for inaccuracy and unavailability. Media that fall short of the determined quality guidelines are eliminated from the final collection. The final collection will be determined at the end of this embodiment and be processed by the next.

A main purpose for discarding media files is to be able to better and more accurately and thematically, complete the next embodiment. Another main purpose is to have the machine learning model make uniform the quality, metadata, and content of the media files in a pared down subcollection of user-submitted media files. In this embodiment, several technologies utilized are standardized, widely available functions that are publicly available. These include facial recognition/detection technologies and object/landmark recognition technologies. Basic functions of those include the detection of known/famous landmarks, facial detection, facial comparison and matching, and clothing recognition, comparison, and matching. The other side is metadata extraction, which reads the exchangeable image file format (Exif) of each piece of metadata associated with a known digital image. Analyses are also performed on that data and are used to enhance the machine learning model.

In particular, a preliminary concern to address is media file type. A media file type is a standardization of how information is encoded to be stored in a computer. There are many types of media file types. For an image, these include JPEG, GIF, PNG, RAW, and TIFF. For a video, these include MP4, MOV, WMV, AVI, and AVCHD. The types of media files the machine learning model could potentially accept include any type of video or image. If an implementation of the machine learning model does not accept certain file types, an embedded ability to convert from one type to another would be necessary.

In block 140, with a set of user-inputted images and videos, the ML model is configured to first assesses the quality and content of each media file through the following processes, as applicable.

Figures 2A, 2B:
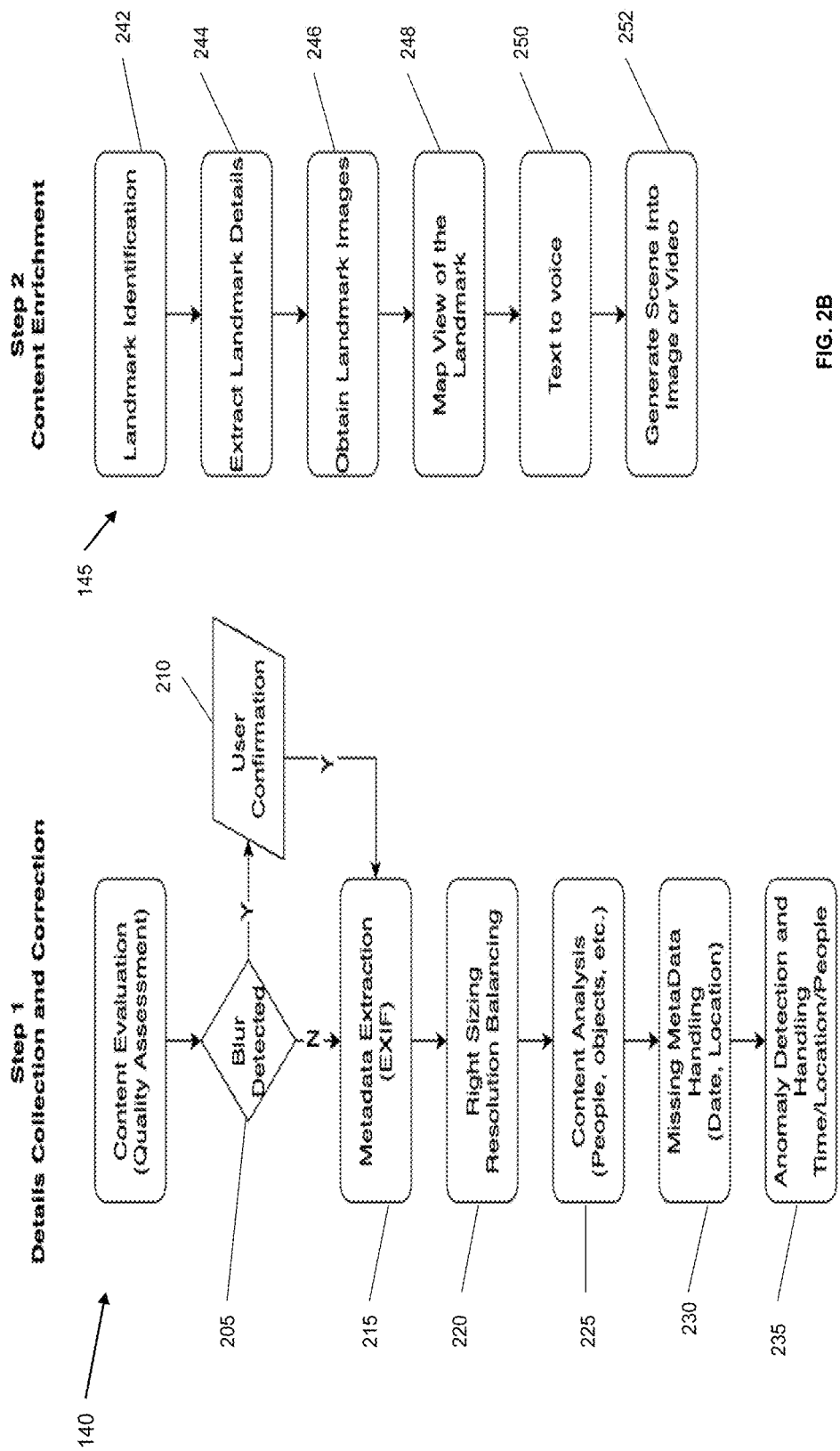
FIGS. 2A and 2B illustrate one embodiment of a method for using a machine learning model and a neural network to predict data anomalies and content enrichment of digital images for use in video generation.

With respect to block 140, attention is directed to FIG. 2A. One embodiment of a method 140 for assessing the quality and content of each media file is illustrated. The method 140 is performed by at least a processor of a computer system that accesses and interacts with memories and/or data storage devices. For example, the processor at least accesses and reads/writes data to the memory and processes network communications to perform the actions of FIG. 2A.

With respect to FIG. 2A, the method 140 is initiated at block 205 when blur detection by the ML model is first implemented. Typically, blurred images are produced when a camera focuses on one area in preparation to take a shot and recomposing the shot fails. The following are the causes of blurry images: camera movement; subject movement; missed focus; insufficient depth of field; and lens softness. Methods for detecting blurred images or photos exist are well known.

In block 210, if a blurred image is detected by the machine learning model, the ML model queries to the user to confirm whether the media file (e.g., photograph) should be kept in the collection or removed through GUI 902 (FIG. 9), as will be discussed in greater detail later.

In block 215, if a blurred image is detected, and kept in the collection by the user, or if no blur has been detected, the machine learning model will be configured to then obtain the metadata of the media files. For a photo or video, this is called the exchangeable image file format (Exif), which is a standard format for the images, sound, and ancillary tags used by digital (including smartphone) cameras and other systems that handle media files recorded by digital cameras (e.g., image and sound files). The embedded metadata of an image file may include, but is not limited to, the camera data, such as its manufacturer and camera model, the resolution, the date and time it was created, whether or not a flash was used, geographical information, etc. It is well known to utilize various Exif extraction tools such as Metapicz, Metadata2Go, and Jimpl.

As such, the ML model is configured to learn and define a blurred image so that the machine learning model can detect if a particular digital image is blurred. This information can be used to exclude blurry images from the known digital images that are not blurry which should improve the accuracy (and speed of image processing) of the ML model by removing blurry images from being considered.

After it has been determined whether the digital image is blurry, in block 220, right sizing and resolution balancing of the digital image is performed by the machine learning model. In particular, the ML model is configured to perform right sizing and resolution balancing for images and videos that lack the resolution to produce a high-quality appearance. For example, image enhancers and upscalers can be used to increase image resolution without detracting from the original quality of the image.

There are two ways this is achieved. Traditional methods start with a low-resolution image and try to improve the quality. On the other hand, the machine learning model can be configured to employ deep learning. Taking a low-resolution image, the machine learning model would predict a high-resolution image that would closely resemble the original image. Examples of such image enhancing services include Deep-Image, Icons8, Upscalepics, and VanceAI. Video enhancers work in a similar way, often using machine learning models, as well. Such video enhancing includes Topaz Video Enhance AI, Video2X, etc. The choice of which images to upscale to 720p (SD—standard definition, HD—high definition, or 4K) can be chosen based on the requirement of the output. Ultimately, the user may choose the scale to which the media files will be scaled up with these technologies.

As such, the ML model learns and defines the right sizing and resolution balancing of the digital image. This information can be used to assist the user in choosing the scale to which the files will be scaled up which should improve the accuracy (and speed of image processing) of the ML model by right sizing and resolution balancing of the digital image.

After the right sizing and resolution balancing of the digital image is performed, in block 225, content analysis is performed by the machine learning model. In particular, content analysis is an operation wherein the machine learning model is configured to generate a database of identifications of the content (e.g., subject or theme) of each media file. In one embodiment, the machine learning model can be configured to use facial recognition technology to determine the set of distinct people present in each file. Key features of subjects can be saved in a database, such as age, expression, and gender. The machine learning model is configured to save those identifications in the media set's database. Multiple facial detection technologies are available, including Google's Cloud Vision API and Amazon Rekognition.

Furthermore, in one embodiment, the machine learning model can be configured to use landmark detection to detect popular natural and human-made structures within an image or video. Both technologies (for image and video) are well-developed. Landmark detection detects well-known or important natural and human-made structures within an image. Google Cloud Vision API is one such service that accomplishes this goal.

Finally, in one embodiment, the machine learning model can be configured for object detection and tracking. A goal being to identify a set of objects, uniquely identify each, and then recognize when these objects are in different image files (pictures or videos). This technology has multiple developments. Relatedly, multiple object tracing accomplishes the same for a media file but can identify and track multiple objects.

As such, the ML model learns and defines the content analysis of the digital image. This information can be used for facial recognition, landmark detection, and object detection and tracking which should improve the accuracy (and speed of image processing) of the ML model by more efficiently analyzing the content of the digital image.

After the content analysis of the digital image has been performed, in block 230, the analysis and handling of missing metadata is performed by the machine learning model. In one embodiment, this process ensures that certain missing pieces of metadata still allow a relevant media file to remain in the final collection. Take, for instance, a video source that does not have location services. Analyzing the video with facial recognition, cataloging the distinct subjects, and finding common subjects in the media set's database may validate its belonging within the final set. The two data pieces handled are those two that matter the most for content organization: location and date.

Figure 3:
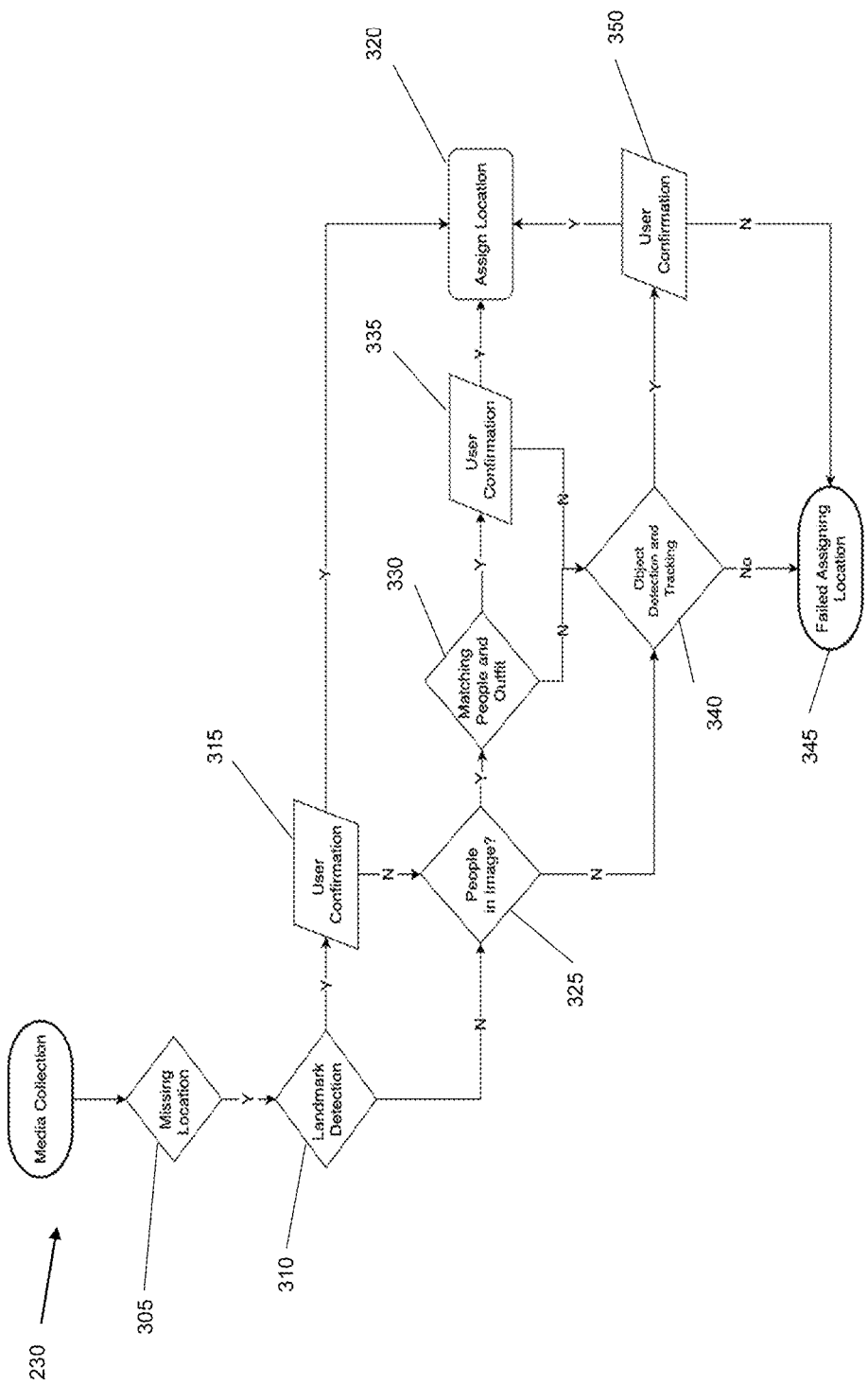
FIG. 3 illustrates one embodiment of a method for using a machine learning model and a neural network for automated handling of location-based missing metadata.

With respect to block 230, attention is directed to FIG. 3. One embodiment of a method 230 for analyzing and handling of missing location-based metadata. The method 230 is performed by at least a processor of a computer system that accesses and interacts with memories and/or data storage devices. For example, the processor at least accesses and reads/writes data to the memory and processes network communications to perform the actions of FIG. 3.

With respect to FIG. 3, if neither the location nor date are missing for a file, the machine learning model is configured to proceed to process the digital image with further embodiments. However, in the case that the location-based metadata is missing, the method 230 is initiated at block 305, when the location-based metadata is checked by the machine learning model.

In block 310, if the location metadata is missing, the landmark detection is implemented, as discussed earlier.

In block 315, if a landmark is detected, the ML model is configured to query the user to confirm the verity of the landmark through GUI 1000 (FIG. 10), as will be discussed in greater detail later.

In block 320, once confirmed, the location for the media file is assigned by the ML model as being associated with that landmark.

In block 325, if landmark detection fails or the user confirms that the landmark detection is incorrect, then further analysis is performed. In one embodiment, subject/people detection is implemented, as discussed earlier.

In block 330, if facial detection is successful, then the machine learning model is configured to check for people common in other media files. If common subjects are detected, then the machine learning model is configured to check for matching clothing as a further identifier for a fit.

In block 335, when comparing media with missing location information to media with location information, if both "matching people" and "matching outfit" criteria are met, then the ML model is configured to query the user to determine if the "matching people" and "matching outfit" are correct. If the "matching people" and "matching outfit" are correct, then the location is assigned in block 320.

If one or both are failed (both "matching people" and "matching outfit" criteria are not met and the user confirms that the "matching people" (block 330) matching outfit" is not correct (block 335)), then the machine learning model is configured to proceed to block 340. If facial recognition fails to identify people, the machine learning model is configured to initiate object/label/scene detection. This works in much the same fashion as "matching people" and "matching outfit". A media file with a known location and similar object/label/scene is used to query the user as to whether this is the same location. If confirmed by the user, the location is assigned to the media file with unknown location.

In block 345, should all of these functions fail, then location assignment is failed. In this case, the machine learning model is configured to allow the user to manually input the location (block 350), if known. If the user cannot determine the location, the media file is discarded. Once either a location has been assigned or a media file has been discarded from the collection, the machine learning model is configured to check for a missing date within the metadata.

As such, the ML model learns and defines the missing location-based metadata of the digital image. This information can be used to ensure that certain missing pieces of metadata still allow a relevant media file to remain in the final collection which should improve the accuracy (and speed of image processing) of the ML model by more efficiently analyzing the missing location-based metadata of the digital image.

After the analysis of the missing location-based metadata of the digital image has been performed, in block 230 and FIG. 3, the analysis and handling of missing date-based metadata is performed by the machine learning model.

Figure 4:
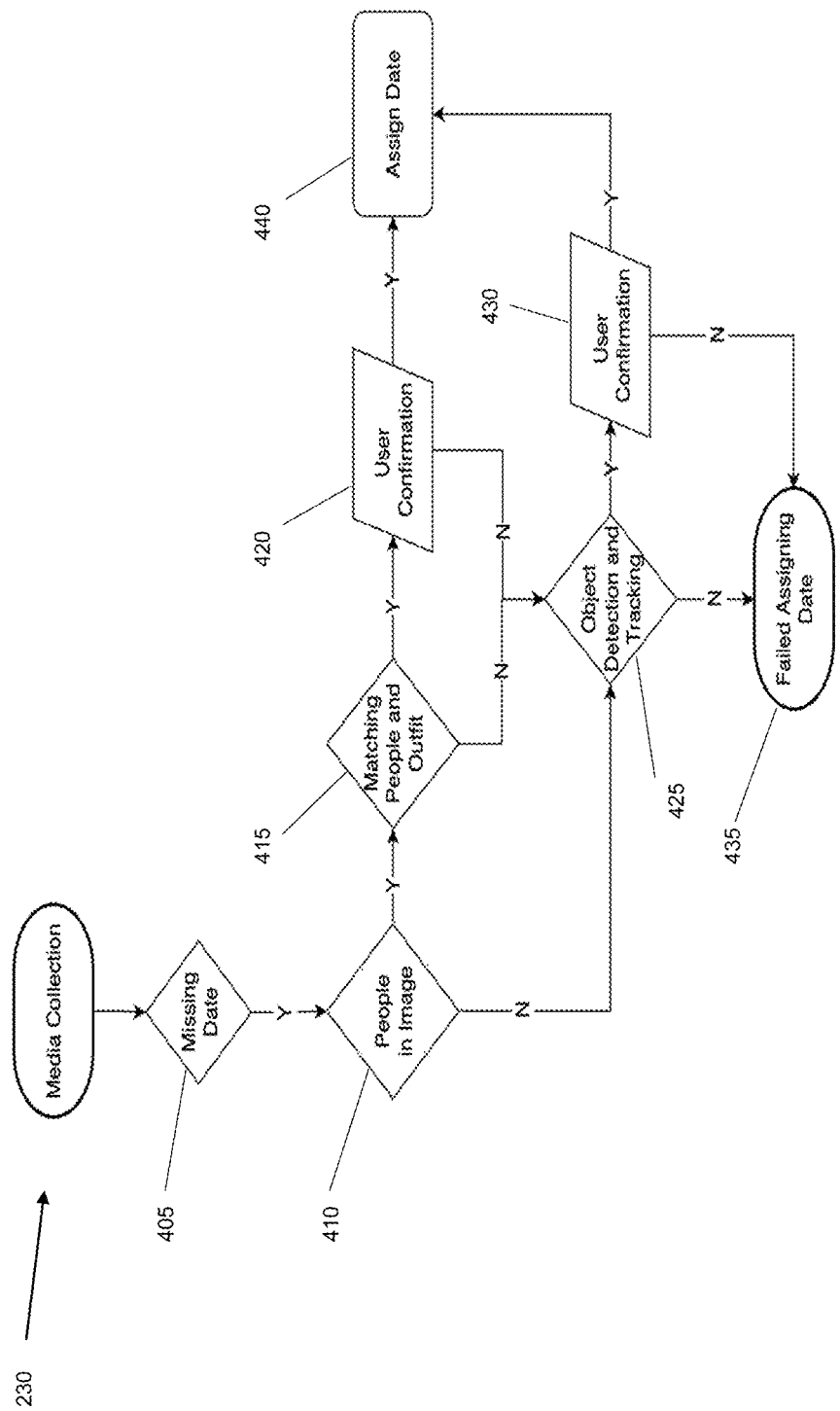
FIG. 4 illustrates one embodiment of a method for using a machine learning model and a neural network for automated handling of date-based missing metadata.

With respect to block 230, attention is directed to FIG. 4 which illustrates one embodiment of a method 230 for analyzing and handling of date-based missing metadata. The method 230 is performed by at least a processor of a computer system that accesses and interacts with memories and/or data storage devices. For example, the processor at least accesses and reads/writes data to the memory and processes network communications to perform the actions of FIG. 4.

As discussed above, with respect to FIG. 4, if neither the location nor date are missing for a media file, the machine learning model is configured to process the digital image with further embodiments. However, in the case that the date-based metadata is missing, the date-based metadata analysis of method 230 is initiated at block 405, when the data-based metadata is checked by the machine learning model.

In block 410, if a creation date of the media file is missing, the machine learning model is configured to check whether there are people displayed in the digital image.

In block 415, if people are displayed in the digital image, the machine learning model is configured to check all the other media files for people with matching faces and clothes (outfit).

Figure 11:
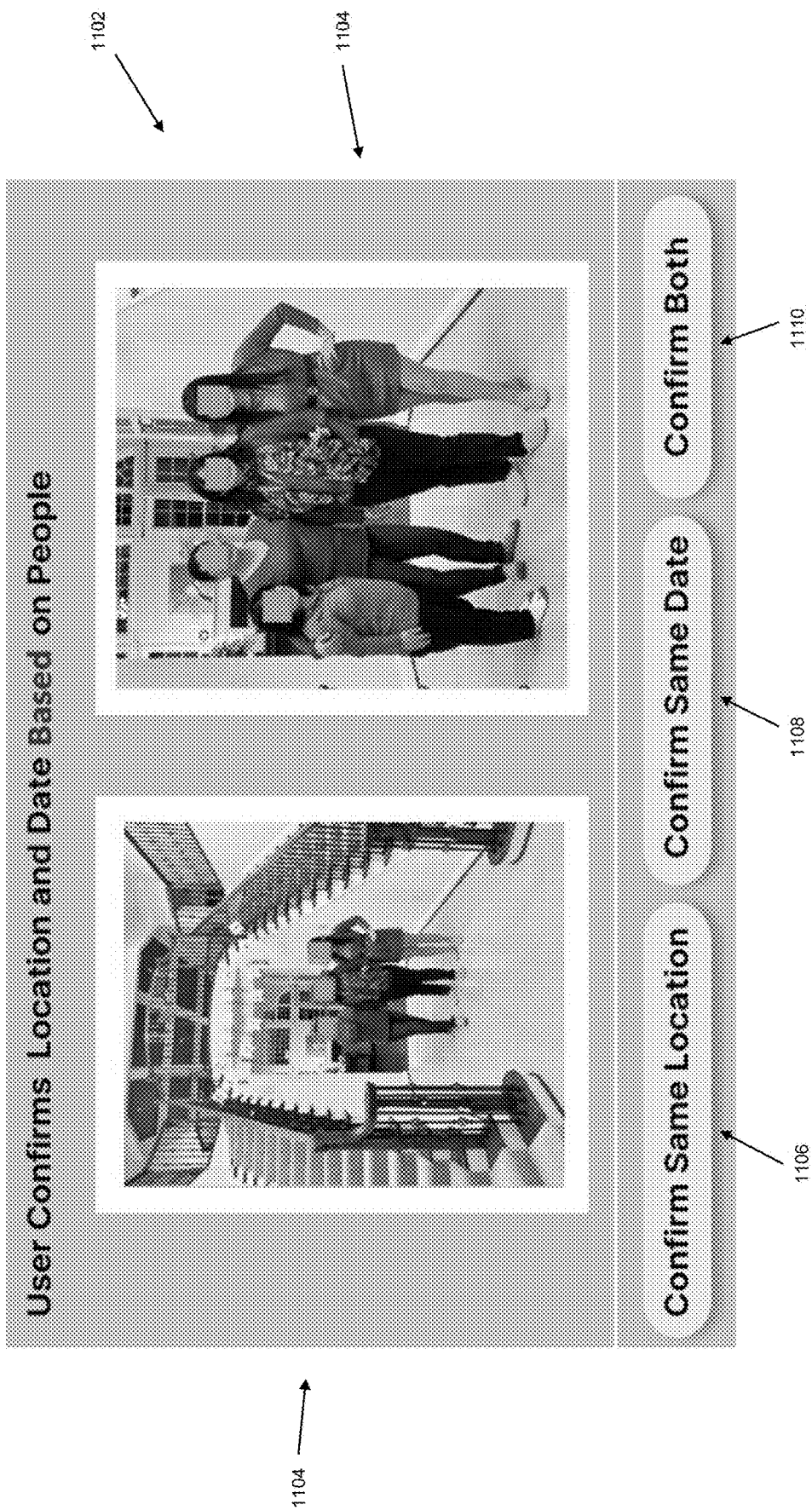
FIG. 11 illustrates one embodiment of a graphical user interface configured to allow the user to confirm a location and date based on the people in the image.

In block 420, if the machine learning model returns a positive match, then the ML model is configured to query the user to confirm the creation date of the media file as the same as the media file with a match through the GUI 1102 (FIG. 11). Here, the user may accept the suggested date or manually enter the correct date. Thus, the metadata is altered, and the date is assigned (block 440).

In block 425, if either there are no people present, or there are not matching people and outfits found, the machine learning model is configured to initiate object detection.

In block 430, if an object within the media file in question is identified in another file, then the user is queried through the GUI 1102. The user may accept the suggested date or manually enter the correct date, thereby altering the metadata, and the date is assigned (block 440).

In block 435, if the user denies both options, assigning a date is failed. The media file is discarded from the final collection.

As such, the ML model learns and defines the missing date-based metadata of the digital image. This information can be used to ensure that certain missing pieces of metadata still allow a relevant media file to remain in the final collection which should improve the accuracy (and speed of image processing) of the ML model by more efficiently analyzing the date-based metadata of the digital image.

Figure 5:
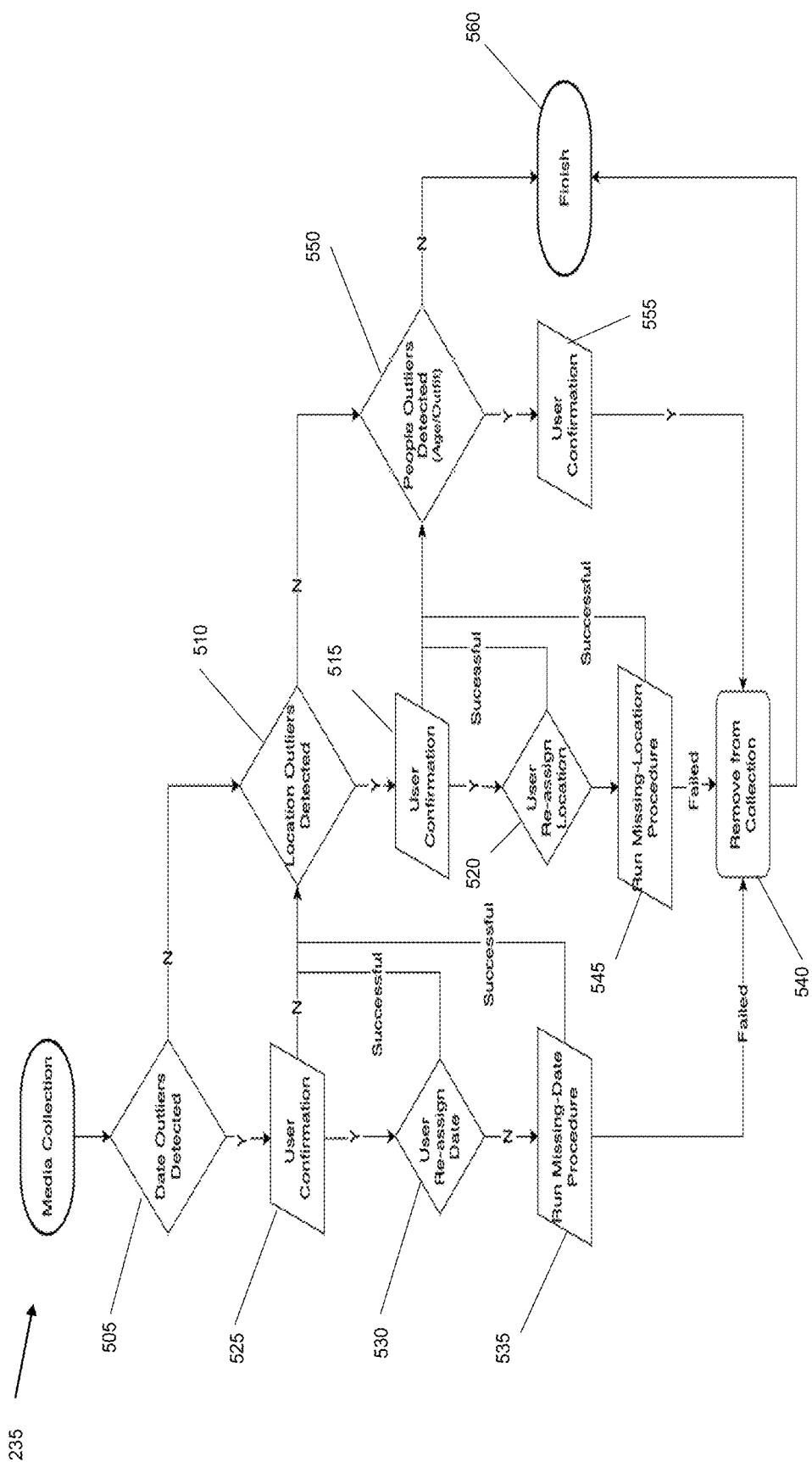
FIG. 5 illustrates one embodiment of a method for using a machine learning model and a neural network for automated metadata anomaly detection and handling.

Returning back to FIG. 2 and with reference to FIG. 5, once the missing location-based and/or date-based metadata have been analyzed and handled by the machine learning model, in block 235, the machine learning model is configured to analyze and handle anomaly detection of the media file in which the metadata exhibits outliers. The method 235 is performed by at least a processor of a computer system that accesses and interacts with memories and/or data storage devices. For example, the processor at least accesses and reads/writes data to the memory and processes network communications to perform the actions of FIG. 5.

Anomaly detection is the process of identifying unexpected items or events in data sets that differ from the norm. Under a few scenarios, the metadata information for media content may be wrong or irrelevant to the rest of the media collection. For instance, an image may display all the same subjects in the same locations as the rest of the set. However, its timestamp is months or years different than the rest. The machine learning model can be configured to provide suggestions for rewriting the metadata.

In one embodiment, three non-limiting cases may be handled: the case of a user submitting a wrong photo for an event; the device used to create a video or picture may have an incorrect time/date set; and/or the device used to create a video or picture may not capture the GPS location due to lack of signal, lack of GPS capability, etc. Sorting or organizing media files with such inconsistencies would thus normally create issues, should the metadata be taken at face value.

The solution presented by the present invention uses a conventional algorithm such as an isolation forest algorithm. This algorithm detects outliers and returns the "anomaly score" of each sample. The "anomaly score" simply indicates the degree to which a data point is anomalous from the remaining set.

With reference to FIG. 5, the method 235 is initiated at block 505, when the anomalies checked for by the machine learning model are date outliers. A date outlier would be defined as a media file with a date creation point anomalous to those of most other media files.

In block 510, if there are no date outliers detected among the media files, then the machine learning model is configured to detect location outliers.

In block 515, if there are any location outliers detected in the media set, the machine learning model is configured to query the user for confirmation of whether it is indeed anomalous and incorrect.

In block 520, if the user confirms this, the user is asked to assign the correct location (block 530).

In block 535, if the user is not able to confirm the date in blocks 525 and 530, the machine learning model is configured to initiate the missing date procedure. This option, if successful, is then presented to the user, who can choose whether the date should be reassigned as such (block 440).

In block 535, if at any point the correct date is assigned, by the user or by the missing date procedure, the media file moves on to be evaluated in block 510.

In block 540, if a date cannot be reassigned, the machine learning model is configured to discard the media file from the final collection of media files.

After assessing date outlier options, the machine learning model is configured to then process the media files in which location outliers are detected. A location outlier would be defined as a media file with a GPS creation point anomalous to those of most other media files. For such media files, the machine learning model is configured to evaluate if the media file can be reassigned a location based on similar features to other media files (block 520). Then, if the user confirms an anomalous location tag (block 515), the option to input a location is presented.

If the user denies that the location is anomalous, the location tag is preserved, and the media file is further evaluated.

In block 545, if the user cannot determine a location, the machine learning model is configured to initiate the missing location procedure. If at any point the location is updated, the media file moves on to be further evaluated.

In block 540, if a location cannot be reassigned, then the media file is removed from the final media file collection.

Finally, after processing time and location outliers, in block 550, outliers in subjects are detected. This would be assessed based on the database of distinct individuals. There are three cases in which a person may be considered an anomaly, or possibly in combination with each other. The criteria are: should the machine learning model determine that the same subject appears in the photos or videos appearing to be of different ages; by the analysis of the machine learning model that the same subject appears, but the same subject is wearing a different outfit than detected in most media files; and additional unexpected person(s) appear in the image compared to other images. If a person reappears in different media files but appears to be different ages within the media files, the outlier ages identified would be assessed as anomalous. Furthermore, if a person reappears in different media files but appears to wear different outfits, outfit instance counts for that person would be considered to define certain outfits as anomalous. The existence of unexpected persons, while found is not considered anomalous as this may be a natural occurrence. Thus, the machine learning model is configured to detect the fit of the subjects and can determine erroneous files with that information.

In block 555, the ML model is configured to query the user to confirm any anomalies. If they are indeed anomalies, the media files are removed from the collection (block 540).

In block 560, if the anomalies are denied, then the media file is retained as is. The choice to discard or keep the media file in the collection is presented to the user to ultimately confirm removal of those files.

As such, the ML model learns and defines the metadata anomalies. This information can be used to ensure that metadata anomalies are analyzed and handled which should improve the accuracy (and speed of image processing) of the ML model by more efficiently analyzing the metadata anomalies of the digital image.

Returning back to FIG. 1B, the process of analyzing and handling the media files continues with content enrichment (block 145). It is to be understood that with reference to FIG. 1B, the process from FIG. 1A continues.

Figure 6:
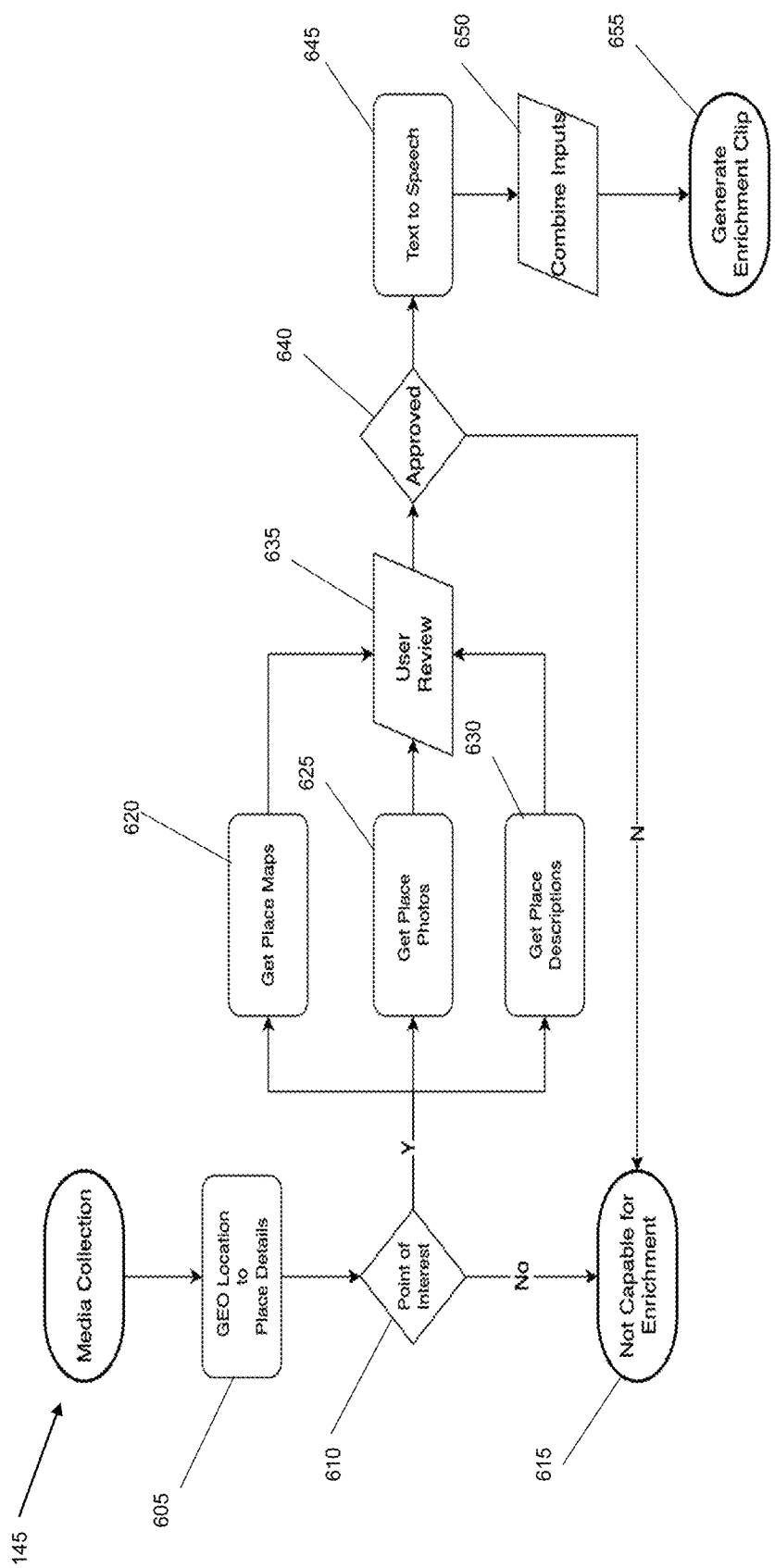
FIG. 6 illustrates one embodiment of a method for using a machine learning model and a neural network for automated content enrichment and scene header and scene introduction.

With reference to content enrichment step 145, attention is directed to FIGS. 2B and 6. The method 145 is performed by at least a processor of a computer system that accesses and interacts with memories and/or data storage devices. For example, the processor at least accesses and reads/writes data to the memory and processes network communications to perform the actions of FIGS. 2B and 6.

Content enrichment is for enhancing the presentation of a location, giving additional background information to viewers of the end collection. The outcomes may include, but are not limited to, a map of the nearby location, additional photos of the location, and/or descriptions of the location.

With reference to FIG. 2B, in block 242, the method 145 is initiated by the machine learning model with landmark identification using preexisting technologies (e.g., Google Landmark Recognition) to determine if media file content includes landmarks.

In block 244, in one embodiment, the machine learning model is configured to extract landmark details.

In block 246, in one embodiment, the ML model is configured to obtain landmark images.

In block 248, in one embodiment, the ML model is configured to obtain a map view of the landmark.

In order to provide more context with respect to blocks 244-248, as shown in block 605 (FIG. 6), ML model is configured to use the geographical location of a media file provided by its metadata in order to analyze the media image or media video. Furthermore, in block 610 if the media image or media video shows a landmark, or point of interest (POI), the media image or media video file receives a landmark tag. In block 615, if the place is not a landmark, then content enrichment is not available. Otherwise, landmark details may include, but are not limited to, place background, address, place type, and place. Google Place API is one well known service that determines the location. In block 620, in one embodiment, the machine learning model can be configured to obtain a map of the local area of the landmark. Google MyMap or Mapfit are well known services that could provide a custom map of the local area of the landmark. In one embodiment, the machine learning model can be configured to obtain additional photos of the location and additional location descriptions from the internet (blocks 625 and 630). In block 635, the ML model can be configured to query the user to review the information from blocks 244-248 and 620-630.

In block 640, if acceptable in relevance and chosen to be included, by the user, the content enrichment will be included.

Returning back to FIG. 2B, in block 250, in one embodiment, the machine learning model can be configured to obtain textual information from various conventional sources, such as Wikipedia or elsewhere.

In particular, in block 655, an introduction (enrichment clip) will be created from the landmark's text-to-speech information (block 645) and the additional images (block 650) such as map (block 620), location photos (block 625), and/or location description (block 630).

In block 252, in one embodiment, the machine learning model may be configured to generate and present to the user an option to generate the landmark introductory scene (enrichment clip in block 655) into a media image or media video.

As such, the ML model learns and defines the content enrichment. This information can be used to ensure that any content of the media image or media video can be enriched which should improve the accuracy (and speed of image processing) of the ML model by more efficiently enriching the content of the media image or media video.

Returning back to FIG. 1B, after the content enrichment has been completed by the machine learning model, the process of analyzing and handling the media files continues with organizing the media file content (block 150). Content organization prepares the set of confirmed files for presentation or distribution purposes.

Figure 7:
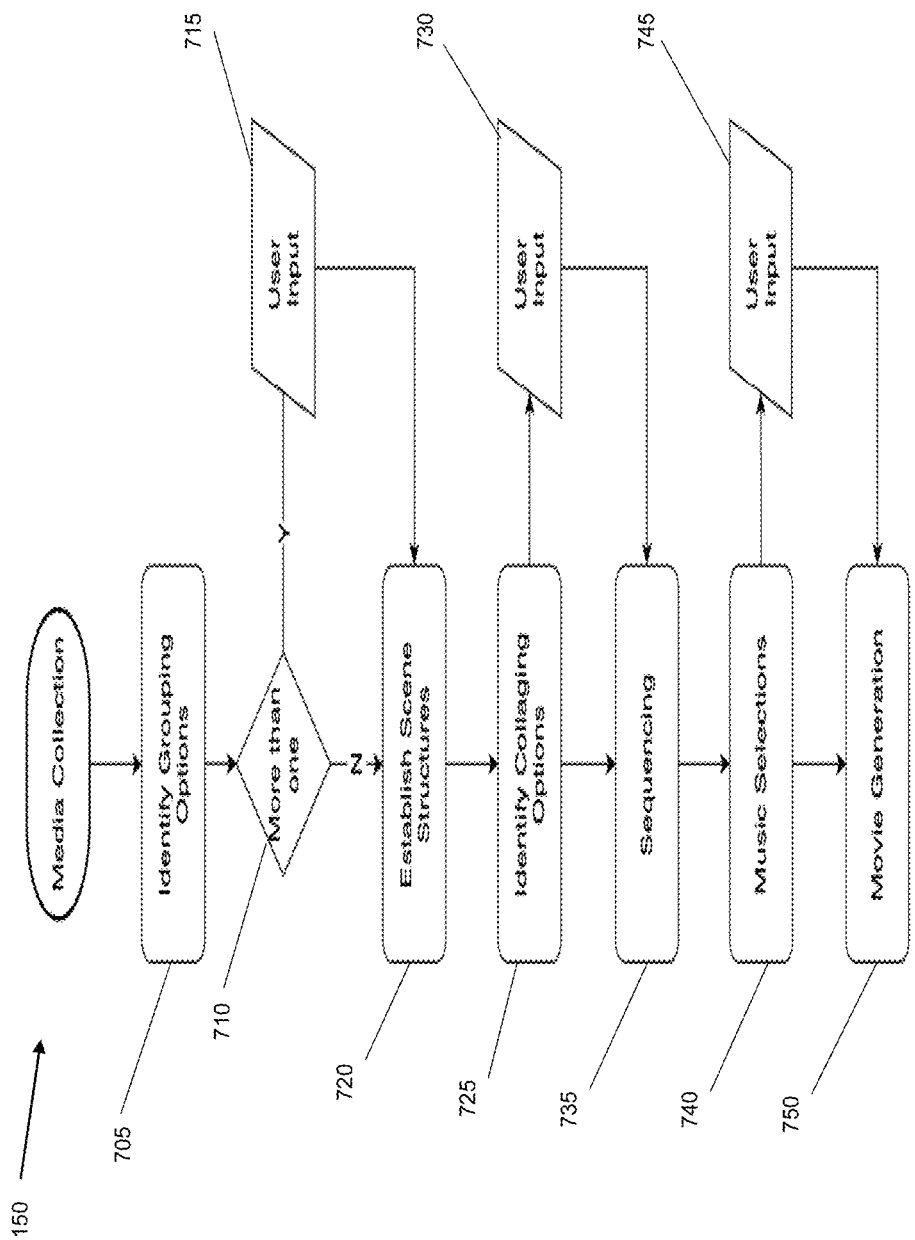
FIG. 7 illustrates one embodiment of a method for using a machine learning model and a neural network for automated media content clustering and organization.

With reference to organizing the media file content (block 150), attention is directed to FIG. 7. The method 150 is performed by at least a processor of a computer system that accesses and interacts with memories and/or data storage devices. For example, the processor at least accesses and reads/writes data to the memory and processes network communications to perform the actions of FIG. 7.

In block 705, the method 150 is initiated when the machine learning model is configured to organize media files by activity. This could mean grouping all photos that recognize subjects, for example, eating, snorkeling, walking in a city, or participating in other activities.

For example, consider the experience of a group of friends, three couples, vacationing on a cruise ship. Suppose that the cruise sets off from Los Angeles, CA; travels to Seattle, WA; and makes several stops along the West Coast of the United States: Santa Barbara, CA; Monterey, CA; and San Francisco, CA One organization option is by time and location. With the previous embodiments having handled missing or anomalous dates, each media file remaining in the collection reliably has time and/or date data. However, on a cruise ship, there may not be internet available all the time. Perhaps in conjunction, some friends might be using cameras with no location data capabilities. During their time on the water, then, the location is unknown. The user may then simply want to label their stretches of time on the water simply as "cruise time" and their city time similarly as such. Alternatively, time ranges of one or more days could present the vacation in a linear, easy-to-understand way.

However, perhaps the experience is more memorable based on the couples featured. Perhaps one is celebrating an anniversary and has special events planned. An organization featuring them could be better suited to commemorate this cruise trip. Photos of the group all together, but groups of photos featuring couples separately at each leg of the journey, would map the couples' experiences to highlight their relationships.

In block 710, if there is more than one option identified, such as in the above example, the ML model is configured to query the user to choose the organization (block 715). Then, the machine learning model is configured to sort the media files. If there was only one grouping option, the machine learning model generates the scene structure 800.

In block 720, in one embodiment, the machine learning model identifies and establishes scene structures. As will be discussed in greater detail later, a scene structure 800 (FIG. 8) is the thematic organization of media files according to their time and/or location created, human subjects featured, objects or activities identified, etc.

In block 725, with sequenced groups, the machine learning model is configured to initiate a collaging options function. In one embodiment, the machine learning model is configured to identity collaging opportunities. This can be defined such as when groupings of media files are of a small-enough size to not be overwhelming when viewed in a mosaic-style orientation, i.e., groups of 3-9 images.

In block 735, within collaging-eligible groups, the ML model is configured to allow the media files to be sequenced, again by the user's choice (temporally or otherwise) (block 730).

In block 740, in one embodiment, the machine learning model is configured to allow music selections from the user (block 745) to be made with the user's input for movie generation (block 750). This last step would present the content enrichment, if desired through the sorted, ordered media files, displayed sequentially with set times, and the chosen accompanying music.

As discussed above with respect to FIG. 8, a scene structure 800 is the thematic organization of media files according to their time and/or location created, human subjects featured, objects or activities identified, etc.

Figure 8:
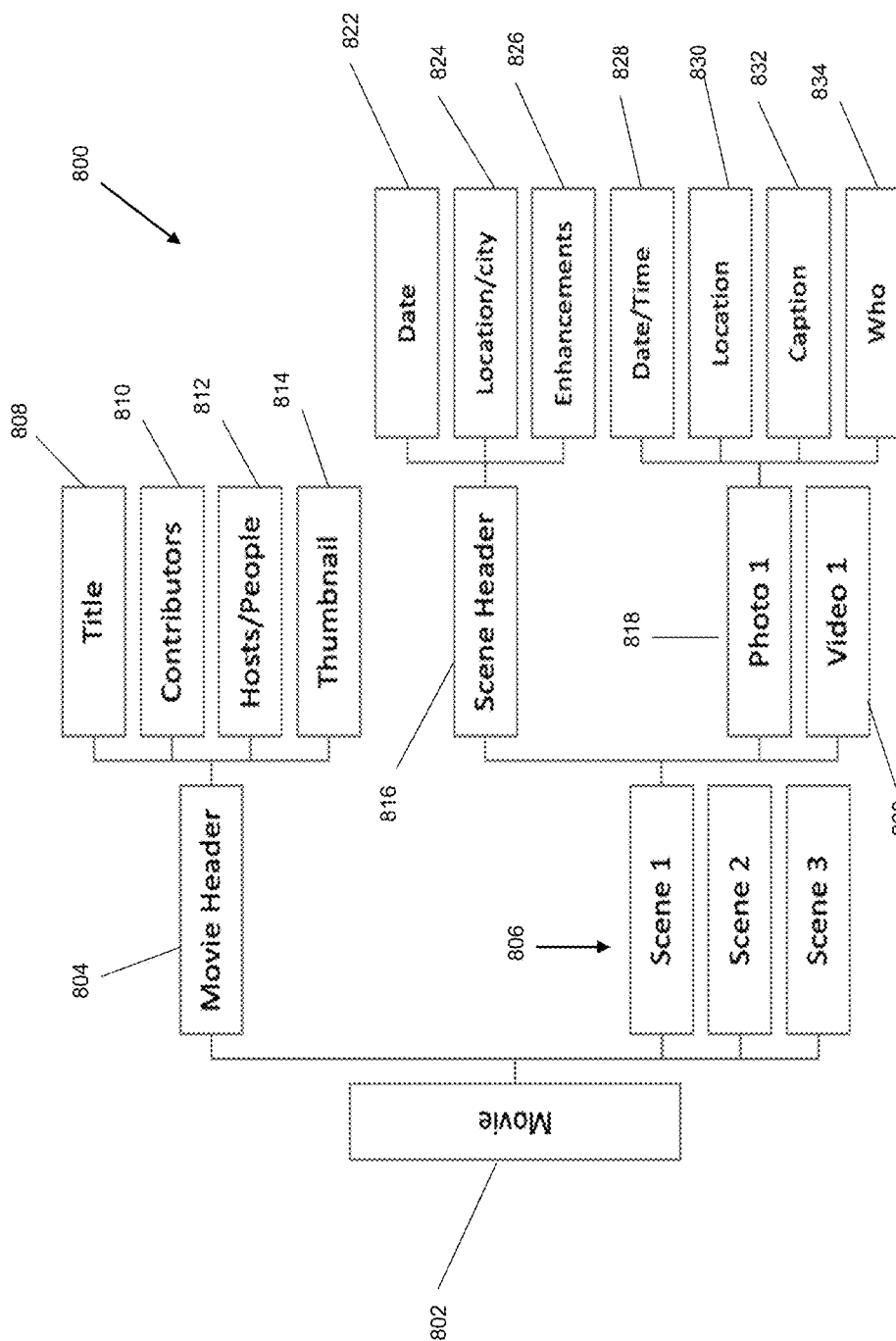
FIG. 8 illustrates one embodiment of a movie scene structure.

As shown in FIG. 8, in one embodiment, the movie scene structure 800 may be a movie 802 (or other similar graphics interchange format (gif)) which can include, but is not limited to a movie header 804, at least one scene 806 (obtained from block 705). Each movie header may be associated with a title 808, movie contributors 810, hosts/people associated with the movie 812, and a movie thumbnail 814.

Regarding at least one scene 806, each scene may be associated with a scene header 816, a photograph 818, and/or a video 820.

Regarding the scene header 816, each scene header 816 may include a date 822 (obtained from block 230 or from the image file), a location 824 (obtained from block 230), and content enhancements 826 (obtained from block 145), as discussed earlier.

Regarding the photograph 818 and/or video 820, each photograph 818 and/or video 820 may be associated with a date/time 828, a location 830, a caption 832, and/or a who 834 is in the photograph 818 and/or video 820.

With respect to FIG. 9, engaged at block 210 and as discussed above, FIG. 9 illustrates a graphical user interface (GUI) 902 that allows the GUI 902 to interact with the ML model to allow a user to confirm a blurred image. In one embodiment, the GUI 902 is configured to include at least one blurry image 904 and a plurality of radio buttons 906 that are configured to interact with the machine learning model to allow the user to keep or remove the blurred image. Furthermore, once a selection has been made by the user to keep or remove a blurred image, the GUI 902 is configured to allow the user to cancel the selection (button 910) or save the selection (button 912).

With respect to FIG. 10, engaged at block 315 and as discussed above, FIG. 10 illustrates a graphical user interface (GUI) 1000 that allows the GUI 1000 to interact with the ML model to allow a user to confirm the landmark detected. In one embodiment, the GUI 1000 is configured to include at least one image of the landmark detected 1002 and a map 1004 of the location of the landmark that are configured to interact with the machine learning model to allow the user to keep or remove the landmark detected. Furthermore, once the detected landmark has been presented to the user through the GUI 1000, the GUI 1000 is configured to allow the user interact with the machine learning model to inform the machine learning model that the user is not sure if it is the correct landmark (button 1006), decline to accept the landmark that was presented to the user (button 1008), or confirm by the user that the landmark presented to the user is accurate (button 1010).

With respect to FIG. 11, engaged at blocks such as 335 and 420 and as discussed above, FIG. 11 illustrates a graphical user interface (GUI) 1102 that allows the GUI 1102 to interact with the ML model to allow the user to confirm the location and date based upon the people associated with a particular media image or video. In one embodiment, the GUI 1102 is configured to include a plurality of images 1104 that the machine learning model determined are associated with the same (or similar) location and date based upon the people associated with the plurality of images.

Furthermore, once the plurality of images 1104 that the machine learning model determined are associated with the same (or similar) location and date based upon the people associated with the plurality of images have been presented to the user through the GUI 1102, the GUI 1102 is configured to allow the user interact with the machine learning model to confirm that the plurality of images are associated with the same location (button 1106), the plurality of images are associated with the same date (button 1108), or the plurality of images are associate with both the same location and the same date (button 1110).

With reference back to FIG. 1b, at block 155, with the ML model trained for analyzing and handling content of media images, additional test images of other media can be input into the ML model in order to analyze and handle the content of those additional test images. At the end of block 155, the ML model should be initially trained to analyze and handle content of media images.

Accordingly, for an input image, the ML model is trained to generate a digital movie 802 (or gif) (FIG. 8) of the final set of images which may or may not include the additional test images based upon the relevance of the additional test images in relation to the initial set of test images that are identified by the ML model.

Operation of Machine Learning Model

Once the machine learning model has been initially trained, attention is now directed to FIG. 1B. With reference to FIG. 1B, at block 160, the new media images are input into the machine learning model. In one embodiment, the machine learning model is configured to analyze the digital pixel data of the new media images and include object-based image analysis to group pixels to identify the new digital image, as discussed above.

Once the digital pixel data of the new media images has been analyzed, the machine learning model is configured to proceed to generate a movie 802 (FIG. 8) based upon the new images (and possibly the training images). It is to be understood that new media images are analyzed and handled in a similar manner as discussed above with respect to the training media images. In particular, the ML model is configured to analyze the images (including the training images) (block 135 in FIG. 1A), assess the quality and content of the media file (including the training images and the new images) (block 140, blocks 205-235 in FIG. 2A, blacks 305-350 in FIG. 3, and blocks 405-440 in FIG. 4, blacks 505-560 in FIG. 5), perform image content enrichment (including the training images and the new images) (black 145, blocks 245-252 in FIG. 2B and blacks 605-655 in FIG. 6), and organize the content of the images (including the training images and the new images) (block 150 and blocks 705-750 in FIG. 7).

In particular, the ML model compares and attempts to match the new images to the known images based on at least the quality and content of the media file (block 140). The ML model is then configured to generate content enrichment for the new images that matches the known images (block 145).

Furthermore, as discussed above, in one embodiment, new images that do not match the known images may be excluded from the final set of images. This will reduce computing resources and processor time.

Once the final set of images have been determined, the machine learning model is configured to organize the content of the images (including the training images and the new images) (block 150).

After the machine learning model organizes the content of the images, the machine learning model is configured to output the movie 802 (or gif) (FIG. 8) of the final set of images. The ML model may be configured to generate an electronic message which includes content of the movie based upon the final set of images.

In one embodiment, the machine learning model may be configured to transmit the movie 802 and/or the electronic message to a remote computer via a network communication over a network. The machine learning model may also be configured to generate and display the movie 802 on display device.

Movie Generation—Robotic Mechanisms

In one embodiment, the ML model (analyzing and handling of media content model 1230 in FIG. 12) may be configured to prepare a hardcopy of the movie 802. For example, after the electronic message is received at a remote computer, the analyzing and handling of media content model 1230 may cause instructions to be sent to one or more image production systems and/or image production databases to prepare a hardcopy of the movie 802.

In another embodiment, the analyzing and handling of media content model may cause instructions for an order to be generated and/or cause a robotic mechanism to prepare a hardcopy of the movie 802. For example, an order may be generated to include a copy of the movie 802 as defined by the analyzing and handling of media content model 1230. The order may then be prepared and fulfilled by retrieving movie data from the order and preparing the movie 802. After the movie 802 is prepared, the movie 802 is shipped or otherwise transported to a destination as identified by the analyzing and handling of media content model 1230. The remote computer may be associated with a warehouse (or fulfillment center) or a sales channel (retail store) and control inventory.

In one embodiment, the systems for processing the order may include, for example, automated robotic machines or mechanisms configured to prepare, package, and transport the movie 802 from a warehouse or store locations based on the order. The movie 802 may then be delivered by the robotic mechanism to automated packaging mechanisms that package the movie 802 in the warehouse.

In one embodiment, the robotic mechanisms may include one or more robots configured to prepare and transport the movie 802 to a destination. Each robot may include at least a body structure, a power source, a control interface, a wired/wireless communication interface, a drive device to move the robot, a navigation device, a movie preparation device capable of preparing the movie 802 based upon the final set of images, one or more sensors, and/or a balance device. Of course, the robot may be configured in different ways and multiple different types of robots may be operating together.

After the movie 802 is transported to a packaging area of the warehouse, the movie 802 is packaged by an automated system. This may include cartonization software that determines quantity, size, and type of container required to package the movie 802, and/or bagging machines that help speed up packaging operations.

The packaged movie 802 is transferred to a shipper, or if the retailer has its own shipment operation, then the retailer's own trucks will take the shipment. The status of the order is changed to "in transit" in the inventory-management system. The order arrives at the destination set forth by the analyzing and handling of media content model 1230. Finally, the computerized management system software then updates the inventory position of the move at the destination set forth by the analyzing and handling of media content model 1230.

Computing Device Embodiment

Figure 12:
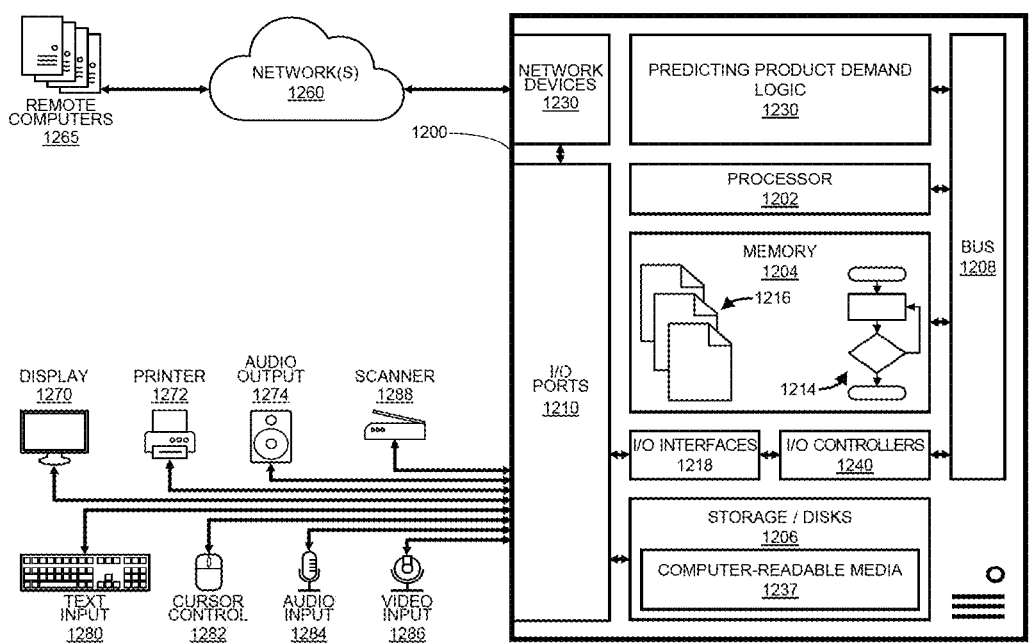
FIG. 12 illustrates an embodiment of a special purpose computing system configured with the example systems and/or methods disclosed.

FIG. 12 illustrates an example computing device that is configured and/or programmed as a special purpose computing device with one or more of the example systems and methods described herein, and/or equivalents. The example computing device may be a computer 1200 that includes at least one hardware processor 1202, a memory 1204, and input/output ports 1210 operably connected by a bus 1208. In one example, the computer 1200 may include an analyzing and handling media content logic 1230 configured to facilitate the analyzing and handling media content similar to logic/systems shown in FIGS. 1A, 1B-11.

In different examples, the logic 1230 may be implemented in hardware, a non-transitory computer-readable medium 1237 with stored instructions, firmware, and/or combinations thereof. While the logic 1230 is illustrated as a hardware component attached to the bus 1208, it is to be appreciated that in other embodiments, the logic 1230 could be implemented in the processor 1202, stored in memory 1204, or stored in disk 1206.

In one embodiment, logic 1230 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to facilitate the analyzing and handling media content. The means may also be implemented as stored computer executable instructions that are presented to computer 1200 as data 1216 that are temporarily stored in memory 1204 and then executed by processor 1202.

Logic 1230 may also provide means (e.g., hardware, non-transitory computer-readable medium that stores executable instructions, firmware) for facilitating the analyzing and handling media content.

Generally describing an example configuration of the computer 1200, the processor 1202 may be a variety of various processors including dual microprocessor and other multi-processor architectures. A memory 1204 may include volatile memory and/or non-volatile memory. Non-volatile memory may include, for example, ROM, PROM, and so on. Volatile memory may include, for example, RAM, SRAM, DRAM, and so on.

A storage disk 1206 may be operably connected to the computer 1200 via, for example, an input/output (I/O) interface (e.g., card, device) 1218 and an input/output port 1210 that are controlled by at least an input/output (I/O) controller 1240. The disk 1206 may be, for example, a magnetic disk drive, a solid-state disk drive, a floppy disk drive, a tape drive, a Zip drive, a flash memory card, a memory stick, and so on. Furthermore, the disk 1206 may be a CD-ROM drive, a CD-R drive, a CD-RW drive, a DVD ROM, and so on. The memory 1204 can store a process 1214 and/or a data 1216, for example. The disk 1206 and/or the memory 1204 can store an operating system that controls and allocates resources of the computer 1200.

The computer 1200 may interact with, control, and/or be controlled by input/output (I/O) devices via the input/output (I/O) controller 1240, the I/O interfaces 1218, and the input/output ports 1210. Input/output devices may include, for example, one or more displays 1270, printers 1272 (such as inkjet, laser, or 3D printers), audio output devices 1274 (such as speakers or headphones), text input devices 1280 (such as keyboards), cursor control devices 1282 for pointing and selection inputs (such as mice, trackballs, touch screens, joysticks, pointing sticks, electronic styluses, electronic pen tablets), audio input devices 1284 (such as microphones or external audio players), video input devices 1286 (such as video and still cameras, or external video players), image scanners 1288, video cards (not shown), disks 1206, network devices 1220, and so on. The input/output ports 1210 may include, for example, serial ports, parallel ports, and USB ports.

The computer 1200 can operate in a network environment and thus may be connected to the network devices 1220 via the I/O interfaces 1218, and/or the I/O ports 1210. Through the network devices 1220, the computer 1200 may interact with a network 1260. Through the network, the computer 1200 may be logically connected to remote computers 1265. Networks with which the computer 1200 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or mare of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A method performed by a computing system comprising at least one processor, the method comprising:
    inputting, to a machine learning model, a plurality of images in digital form;
    determining, by the machine learning model, if any of the plurality of images contains a blurry image;
    in response to determining if any of the plurality of images contains a blurry image, obtaining, by the machine learning model, metadata associated with each of the plurality of images;
    in response to obtaining metadata associated with each of the plurality of images, performing, by the machine learning model, a right sizing and resolution balancing of each of the plurality of images;
    in response to performing a right sizing and resolution balancing of each of the plurality of images, performing, by the machine learning model, content analysis of each of the plurality of images;
    in response to performing content analysis of each of the plurality of images, performing, by the machine learning model, an analysis of missing metadata associated with each of the plurality of images;
    in response to performing an analysis of missing metadata associated with each of the plurality of images, performing, by the machine learning model, an anomaly detection of the metadata associated with each of the plurality of images;
    in response to performing an anomaly detection of the metadata associated with each of the plurality of images, creating, by the machine learning model, an enrichment of content associated with each of the plurality of images;
    in response to creating an enrichment of content associated with each of the plurality of images, creating, by the machine learning model, an organization of each of the images including the enrichment of content associated with each of the plurality of images;
    in response to creating an organization of each of the images, generating, by the machine learning model, a digital form of a movie, wherein the movie includes the organization of each of the images including the enrichment of content associated with each of the plurality of images;
    in response to generating a digital form of a movie, generating an electronic message, wherein the electronic message includes the digital form of the movie; and
    in response to generating an electronic message, transmitting the electronic message to a remote computer.

2. The method of claim 1, wherein performing an analysis of missing metadata associated with each of the plurality of images further comprises:
    determining, by the machine learning model, if location-based metadata is missing from the metadata of the image;
    in response to determining that location-based metadata is missing from the metadata, performing, by the machine learning model, landmark detection;
    in response to detecting a landmark, generating by the machine learning model, a first user interface to confirm a verity of the landmark;

in response to confirming the verity of the landmark, assigning, by the machine learning model, a location of the landmark to the landmark associated with the image;

in response to confirming that the verity of the landmark is not correct, implementing, by the machine learning model, a detection of a subject in the image;

in response to detecting a subject in the image, determining, by the machine learning model, if other images of the plurality of images include the subject in the image;

in response to determining that the subject in the image is located in at least one of the other images of the plurality of images, determining, by the machine learning model, if the subject in the image has matching clothing in the image and the at least one of the other images;

in response to determining that the subject is located in at least one of the other images of the plurality of images and the subject has matching clothing in the image and the at least one of the other images, generating by the machine learning model, a second user interface to confirm that the subject is located in at least one of the other images of the plurality of images and the subject has matching clothing in the image and the at least one of the other images;

in response to determining that either the subject is not located in at least one of the other images of the plurality of images or the subject does not have matching clothing in the image and the at least one of the other images, performing, by the machine learning model, a detection of an object, label, or scene associated with the image; and in response to the object, label, or scene associated with the image not being detected in the image, manually assigning a location to the image.

3. The method of claim 2, wherein performing an analysis of missing metadata associated with each of the plurality of images further comprises:

determining, by the machine learning model, if date-based metadata is missing from the metadata of the image;

in response to determining that a creation date of the image is missing, determining, by the machine learning model, if the subject is displayed in the image;

in response to determining that the subject is displayed in the image, determining, by the machine learning model, if the subject is located in at least one of the other images of the plurality of images and a face of the subject and an outfit of the subject in the image match a face and an outfit of a subject in the at least one of the other images of the plurality of images;

in response to determining that the subject is located in at least one of the other images of the plurality of images and the face of the subject and the outfit of the subject in the image matches the face and the outfit of the subject in the at least one of the other images of the plurality of images, generating by the machine learning model, a second user interface to confirm the creation date of the image;

in response to determining that the subject is not located in at least one of the other images of the plurality of images and the face of the subject and the outfit of the subject in the image does not match the face and the outfit of the subject in the at least one of the other images of the plurality of images, performing, by the machine learning model, a detection of an object in the image;

in response to determining that the object in the image is identified in at least one of the other images of the plurality of images, generating by the machine learning model, the second user interface to confirm the creation date of the image; and in response to determining that the subject is not located in at least one of the other images of the plurality of images and the face of the subject and the outfit of the subject in the image does not match the face and the outfit of the subject in the at least one of the other images of the plurality of images and in response to determining that the object in the image is not identified in at least one of the other images of the plurality of images, discarding, by the machine learning model, the image.

4. The method of claim 1, wherein performing an anomaly detection of the metadata associated with each of the plurality of images further comprises:

determining, by the machine learning model, if metadata of the image contains date outliers;

in response to determining that the metadata of the image does not contain any date outliers, determining, by the machine learning model, if the metadata of the image contains location outliers;

in response to determining that the metadata of the image contains location outliers, determining if the location outliers are anomalous and incorrect;

in response to determining that the location outliers are anomalous and incorrect, assigning a correct creation date to the image;

in response to not being able to determine if the location outliers are anomalous and incorrect, assigning, by the machine learning model, the creation date of the image;

in response to the creation date of the image being assigned by the machine learning model, determining if the assigned creation date of the image is correct;

in response to determining that the assigned creation date of the image is correct, assigning, by the machine learning model, the creation date to the image; and in response to determining that the assigned creation date of the image is not correct, discarding the image.

5. The method of claim 1, wherein creating an enrichment of content associated with each of the plurality of images further comprises:

determining, by the machine learning model, a geographical location of the image;

determining, by the machine learning model, if the image contains a landmark;

in response to determining that the image contains a landmark, obtaining, by the machine learning model, a map associated with the landmark and textual information associated with the landmark;

in response to obtaining the map and the textual information associated with the landmark adding data associated with the map and the textual information to the image;

in response to adding the data associated with the map and the textual information to the image, determining if the data associated with the map and the textual information added to the image is to be included with the image; and in response to determining that the data associated with the map and the textual information added to the image is to be included with the image, adding, by the machine learning model, the data associated with the map and the textual information to the image.

6. The method of claim 1, creating an organization of each of the images further comprises:
- determining, by the machine learning model, at least one scene structure;
- in response to determining at least one scene structure, determining, by the machine learning model, an activity in the image;
- in response to determining an activity in the image, determining, by the machine learning model, a grouping of the image with the activity;
- in response to determining that a plurality of images are grouped into a plurality of groupings, collaging, by the machine learning model, the plurality of groupings;
- in response to collaging the plurality of groupings, perform, by the machine learning model, a sequencing of the plurality of groupings; and
- in response to sequencing the plurality of groupings, attaching, by the machine learning model, music to each of the plurality of groupings.

7. The method of claim 1, wherein determining if any of the plurality of images contain a blurry image further comprises:
- generating, by the machine learning model, a third user interface to confirm that the image is blurry;
  - wherein the third user interface further comprises;
    - at least one of the plurality of images,
    - at least one button to allow a selection of whether the least one of the plurality of images should be kept,
    - at least one button to allow a selection of whether the least one of the plurality of images should be removed,
    - at least one button to allow a cancellation of the confirmation that the image is blurry, and
    - at least one button to allow a saving of the determination as to whether the selection of whether the least one of the plurality of images should be kept or to avow a selection of whether the least one of the plurality of images should be removed.

8. A non-transitory computer-readable medium storing computer-executable instructions that, when executed by a computer including a processor, cause the computer to perform functions configured by the computer-executable instructions, wherein the instructions comprise:
- input, to a machine learning model, a plurality of images in digital form;
- determine, by the machine learning model, if any of the plurality of images contains a blurry image;
- in response to determining any of the plurality of images contains a blurry image, obtain, by the machine learning model, metadata associated with each of the plurality of images;
- in response to obtaining metadata associated with each of the plurality of images, perform, by the machine learning model, a right sizing and resolution balancing of each of the plurality of images;
- in response to performing a right sizing and resolution balancing of each of the plurality of images, perform, by the machine learning model, content analysis of each of the plurality of images;
- in response to performing content analysis of each of the plurality of images, perform, by the machine learning model, an analysis of missing metadata associated with each of the plurality of images;
- in response to performing an analysis of missing metadata associated with each of the plurality of images, perform, by the machine learning model, an anomaly detection of the metadata associated with each of the plurality of images;
- in response to performing an anomaly detection of the metadata associated with each of the plurality of images, create, by the machine learning model, an enrichment of content associated with each of the plurality of images;
- in response to creating an enrichment of content associated with each of the plurality of images, create, by the machine learning model, an organization of each of the images including the enrichment of content associated with each of the plurality of images;
- in response to creating an organization of each of the images, generate, by the machine learning model, a digital form of a movie, wherein the movie includes the organization of each of the images including the enrichment of content associated with each of the plurality of images;
- in response to generating a digital form of a movie, generate an electronic message, wherein the electronic message includes the digital form of the movie; and
- in response to generating an electronic message, transmit the electronic message to a remote computer.

9. The non-transitory computer-readable medium of claim 8, further comprising instructions that, when executed by at least the processor, cause the processor to:
- determine by the machine learning model, if location-based metadata is missing from the metadata of the image;
- in response to determining that location-based metadata is missing from the metadata, perform, by the machine learning model, landmark detection;
- in response to detecting a landmark, generate by the machine learning model, a first user interface to confirm a verity of the landmark;
- in response to confirming the verity of the landmark, assigning, by the machine learning model, a location of the landmark to the landmark associated with the image;
- in response to confirming that the verity of the landmark is not correct, implement, by the machine learning model, a detection of a subject in the image;
- in response to detecting a subject in the image, determine, by the machine learning model, if other images of the plurality of images include the subject in the image;
- in response to determining that the subject in the image is located in at least one of the other images of the plurality of images, determine, by the machine learning model, if the subject in the image has matching clothing in the image and the at least one of the other images;
- in response to determining that the subject is located in at least one of the other images of the plurality of images and the subject has matching clothing in the image and the at least one of the other images, generate by the machine learning model, a second user interface to confirm that the subject is located in at least one of the other images of the plurality of images and the subject has matching clothing in the image and the at least one of the other images;
- in response to determining that either the subject is not located in at least one of the other images of the plurality of images or the subject does not have matching clothing in the image and the at least one of the other images, perform, by the machine learning model, a detection of an object, label, or scene associated with the image; and in response to the object, label, or scene associated with the image not being detected in the image, manually assign a location to the image.

10. The non-transitory computer-readable medium of claim 9, further comprising instructions that, when executed by at least the processor, cause the processor to:

determine, by the machine learning model, if date-based metadata is missing from the metadata of the image;

in response to determining that a creation date of the image is missing, determine, by the machine learning model, if the subject is displayed in the image;

in response to determining that the subject is displayed in the image, determine, by the machine learning model, if the subject is located in at least one of the other images of the plurality of images and a face of the subject and an outfit of the subject in the image match a face and an outfit of a subject in the at least one of the other images of the plurality of images;

response to determining that the subject is located in at least one of the other images of the plurality of images and the face of the subject and the outfit of the subject in the image matches the face and the outfit of the subject in the at least one of the other images of the plurality of images, generate by the machine learning model, a second user interface to confirm the creation date of the image;

in response to determining that the subject is not located in at least one of the other images of the plurality of images and the face of the subject and the outfit of the subject in the image does not match the face and the outfit of the subject in the at least one of the other images of the plurality of images, perform, by the machine learning model, a detection of an object in the image;

response to determining that the object in the image is identified in at least one of the other images of the plurality of images, generate by the machine learning model, the second user interface to confirm the creation date of the image; and in response to determining that the subject is not located in at least of the other images of the plurality of images and the face of the subject and the outfit of the subject in the image does not match the face and the outfit of the subject in the at least one of the other images of the plurality of images and in response to determining that the object in the image is not identified in at least one of the other images of the plurality of images, discard, by the machine learning model, the image.

11. The non-transitory computer-readable medium of claim 8, further comprising instructions that, when executed by at least the processor, cause the processor to:

determine, by the machine learning model, if metadata of the image contains date outliers;

in response to determining that the metadata of the image does not contain any date outliers, determine, by the machine learning model, if the metadata of the image contains location outliers;

in response to determining that the metadata of the image contains location outliers, determine if the location outliers are anomalous and incorrect;

in response to determining that the location outliers are anomalous and incorrect, assign a correct creation date to the image;

in response to not being able to determine if the location outliers are anomalous and incorrect, assign, by the machine learning model, the creation date of the image;

in response to the creation date of the image being assigned by the machine learning model, determine if the assigned creation date of the image is correct;

in response to determining that the assigned creation date of the image is correct, assign, by the machine learning model, the creation date to the image; and in response to determining that the assigned creation date of the image is not correct, discard the image.

12. The non-transitory computer-readable medium of claim 8, further comprising instructions that, when executed by at least the processor, cause the processor to:

determine, by the machine learning model, a geographical location of the image;

determine, by the machine learning model, if the image contains a landmark;

in response to determining that the image contains a landmark, obtain, by the machine learning model, a map associated with the landmark and textual information associated with the landmark;

in response to obtaining the map and the textual information associated with the landmark, add data associated with the map and the textual information to the image;

in response to adding the data associated with the map and the textual information to the image, determine if the data associated with the map and the textual information added to the image is to be included with the image; and in response to determining that the data associated with the map and the textual information added to the image is to be included with the image, add, by the machine learning model, the data associated with the map and the textual information to the image.

13. The non-transitory computer-readable medium of claim 8, further comprising instructions that, when executed by at least the processor, cause the processor to:

determine, by the machine learning model, at least one scene structure;

in response to determining at least one scene structure, determine, by the machine learning model, an activity in the image;

in response to determining an activity in the image, determine, by the machine learning model, a grouping of the image with the activity;

in response to determining that a plurality of images are grouped into a plurality of groupings, collage, by the machine learning model, the plurality of groupings;

in response to collaging the plurality of groupings, perform, by the machine learning model, a sequencing of the plurality of groupings; and in response to sequencing the plurality of groupings, attach, by the machine learning model, music to each of the plurality of groupings.

14. The non-transitory computer-readable medium of claim 8, further comprising instructions that, when executed by at least the processor, cause the processor to:

generate, by the machine learning model, a third user interface to confirm that the image is blurry;

wherein the third user interface further comprises;

at least one of the plurality of images, at least one button to allow a selection of whether the least one of the plurality of images should be kept, at least one button to allow a selection of whether the least one of the plurality of images should be removed, at least one button to allow a cancellation of the confirmation that the image is blurry, and at least one button to allow a saving of the determination as to whether the selection of whether the least one of the plurality of images should be kept or to avow a selection of whether the least one of the plurality of images should be removed.

15. A computing system, comprising:
   at least one processor connected to at least one memory;
   a non-transitory computer readable medium including instructions stored thereon that, when executed by the at least one processor, cause the at least one processor to:
   input, to a machine learning model, a plurality of images in digital form;
   determine, by the machine learning model, if any of the plurality of images contains a blurry image;
   in response to determining any of the plurality of images contains a blurry image, obtain, by the machine learning model, metadata associated with each of the plurality of images;
   in response to obtaining metadata associated with each of the plurality of images, perform, by the machine learning model, a right sizing and resolution balancing of each of the plurality of images;
   in response to performing a right sizing and resolution balancing of each of the plurality of images, perform, by the machine learning model, content analysis of each of the plurality of images;
   in response to performing content analysis of each of the plurality of images, perform, by the machine learning model, an analysis of missing metadata associated with each of the plurality of images;
   in response to performing an analysis of missing metadata associated with each of the plurality of images, perform, by the machine learning model, an anomaly detection of the metadata associated with each of the plurality of images;
   in response to performing an anomaly detection of the metadata associated with each of the plurality of images, create, by the machine learning model, an enrichment of content associated with each of the plurality of images;
   in response to creating an enrichment of content associated with each of the plurality of images, create, by the machine learning model, an organization of each of the images including the enrichment of content associated with each of the plurality of images;
   in response to creating an organization of each of the images, generate, by the machine learning model, a digital form of a movie, wherein the movie includes the organization of each of the images including the enrichment of content associated with each of the plurality of images;
   in response to generating a digital form of a movie, generate an electronic message, wherein the electronic message includes the digital form of the movie; and
   in response to generating an electronic message, transmit the electronic message to a remote computer.

16. The computing system of claim 15, wherein the instructions further include instructions that, when executed by at least the processor, cause the processor to:
   determine by the machine learning model, if location-based metadata is missing from the metadata of the image;
   in response to determining that location-based metadata is missing from the metadata, perform, by the machine learning model, landmark detection;
   in response to detecting a landmark, generate by the machine learning model, a first user interface to confirm a verity of the landmark;
   in response to confirming the verity of the landmark, assign, by the machine learning model, a location of the landmark to the landmark associated with the image;
   in response to confirming that the verity of the landmark is not correct, implement, by the machine learning model, a detection of a subject in the image;
   in response to detecting a subject in the image, determine, by the machine learning model, if other images of the plurality of images include the subject in the image;
   in response to determining that the subject in the image is located in at least one of the other images of the plurality of images, determine, by the machine learning model, if the subject in the image has matching clothing in the image and the at least one of the other images;
   in response to determining that the subject is located in at least one of the other images of the plurality of images and the subject has matching clothing in the image and the at least one of the other images, generate by the machine learning model, a second user interface to confirm that the subject is located in at least one of the other images of the plurality of images and the subject has matching clothing in the image and the at least one of the other images;
   in response to determining that either the subject is not located in at least one of the other images of the plurality of images or the subject does not have matching clothing in the image and the at least one of the other images, perform, by the machine learning model, a detection of an object, label, or scene associated with the image; and
   in response to the object, label, or scene associated with the image not being detected in the image, manually assign a location to the image.

17. The computing system of claim 16, wherein the instructions further include instructions that, when executed by at least the processor, cause the processor to:
   determine, by the machine learning model, if date-based metadata is missing from the metadata of the image;
   in response to determining that a creation date of the image is missing, determine, by the machine learning model, if the subject is displayed in the image;
   in response to determining that the subject is displayed in the image, determine, by the machine learning model, if the subject is located in at least one of the other images of the plurality of images and a face of the subject and an outfit of the subject in the image match a face and an outfit of a subject in the at least one of the other images of the plurality of images;
   response to determining that the subject is located in at least one of the other images of the plurality of images and the face of the subject and the outfit of the subject in the image matches the face and the outfit of the subject in the at least one of the other images of the plurality of images, generate by the machine learning model, a second user interface to confirm the creation date of the image;
   in response to determining that the subject is not located in at least one of the other images of the plurality of images and the face of the subject and the outfit of the subject in the image does not match the face and the outfit of the subject in the at least one of the other images of the plurality of images, perform, by the machine learning model, a detection of an object in the image;

response to determining that the object in the image is identified in at least one of the other images of the plurality of images, generate by the machine learning model, the second user interface to confirm the creation date of the image; and in response to determining that the subject is not located in at least of the other images of the plurality of images and the face of the subject and the outfit of the subject in the image does not match the face and the outfit of the subject in the at least one of the other images of the plurality of images and in response to determining that the object in the image is not identified in at least one of the other images of the plurality of images, discard, by the machine learning model, the image.

18. The computing system of claim 15, wherein the instructions to generate the predicted characteristic model further include instructions that, when executed by at least the processor, cause the processor to:

determine, by the machine learning model, if metadata of the image contains date outliers;

in response to determining that the metadata of the image does not contain any date outliers, determine, by the machine learning model, if the metadata of the image contains location outliers;

in response to determining that the metadata of the image contains location outliers, determine if the location outliers are anomalous and incorrect;

in response to determining that the location outliers are anomalous and incorrect, assign a correct creation date to the image;

in response to not being able to determine if the location outliers are anomalous and incorrect, assign, by the machine learning model, the creation date of the image;

in response to the creation date of the image being assigned by the machine learning model, determine if the assigned creation date of the image is correct;

in response to determining that the assigned creation date of the image is correct, assign, by the machine learning model, the creation date to the image; and in response to determining that the assigned creation date of the image is not correct, discard the image.

19. The computing system of claim 15, wherein the instructions further include instructions that, when executed by at least the processor, cause the processor to:

determine, by the machine learning model, at least one scene structure;

in response to determining at least one scene structure, determine, by the machine learning model, an activity in the image;

in response to determining an activity in the image, determine, by the machine learning model, a grouping of the image with the activity;

in response to determining that a plurality of images are grouped into a plurality of groupings, collage, by the machine learning model, the plurality of groupings;

in response to collaging the plurality of groupings, perform, by the machine learning model, a sequencing of the plurality of groupings; and in response to sequencing the plurality of groupings, attach, by the machine learning model, music to each of the plurality of groupings.

20. The computing system of claim 15, wherein the instructions further include instructions that, when executed by at least the processor, cause the processor to:

generate, by the machine learning model, a third user interface to confirm that the image is blurry;

wherein the third user interface further comprises;
at least one of the plurality of images,
at least one button to allow a selection of whether the least one of the plurality of images should be kept,
at least one button to allow a selection of whether the least one of the plurality of images should be removed,
at least one button to allow a cancellation of the confirmation that the image is blurry, and
at least one button to allow a saying of the determination as to whether the selection of whether the least one of the plurality of images should be kept or to allow a selection of whether the least one of the plurality of images should be removed.

* * * * *